(12) United States Patent  
Ito et al.

(10) Patent No.: US 9,460,374 B2
(45) Date of Patent: Oct. 4, 2016

(54) PRINTER AND PRINTER CONTROL METHOD

(71) Applicant: Seiko Epson Corporation, Tokyo (JP)

(72) Inventors: Yuichi Ito, Chikuma (JP); Atsushi Sakai, Sakaki-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/681,986

(22) Filed: Apr. 8, 2015

(65) Prior Publication Data

US 2015/0213348 A1 Jul. 30, 2015

Related U.S. Application Data

(63) Continuation of application No. 13/408,708, filed on Feb. 29, 2012, now abandoned.

(30) Foreign Application Priority Data

Mar. 2, 2011 (JP) ................................. 2011-045451

(51) Int. Cl.
| | |
|---|---|
| G06K 15/00 | (2006.01) |
| G06T 11/00 | (2006.01) |
| B41J 3/36 | (2006.01) |
| B41J 11/00 | (2006.01) |
| B41J 13/00 | (2006.01) |
| G06K 15/02 | (2006.01) |

(52) U.S. Cl.
CPC .......... *G06K 15/4065* (2013.01); *B41J 11/008* (2013.01); *B41J 13/0054* (2013.01); *G06K 15/1805* (2013.01)

(58) Field of Classification Search
CPC ...... G06K 15/00; G06K 15/16; G06K 15/02; G06K 2215/0082
See application file for complete search history.

(56) References Cited

U.S. PATENT DOCUMENTS

| | | | |
|---|---|---|---|
| 5,208,902 A | 5/1993 | Kumon | |
| 5,544,043 A | 8/1996 | Miki et al. | |
| 6,293,717 B1 | 9/2001 | Kurashina | |
| 6,323,961 B1 | 11/2001 | Rackman | |
| 2001/0017625 A1* | 8/2001 | Shimamura | G06K 15/00 345/467 |
| 2001/0024585 A1 | 9/2001 | Koakutsu et al. | |
| 2007/0120937 A1* | 5/2007 | Ahne | B41J 3/36 347/109 |
| 2011/0181905 A1* | 7/2011 | Saikawa | G06F 3/1234 358/1.14 |

FOREIGN PATENT DOCUMENTS

| | | |
|---|---|---|
| EP | 1 630 662 A1 | 3/2006 |
| JP | 05-011947 A | 1/1993 |

(Continued)

*Primary Examiner* — Tammy Pham
*Assistant Examiner* — Frantz Bataille

(57) ABSTRACT

A conversion area in a storage of a printer is determined to accommodate slips of different sizes. Slips are conveyed along a path that is guided on one side and open on the other. A detector detects the length of the slip in the conveyance direction. Dimensions of the conversion area are determined based on the detected length of the slip, and a recording range of a recording head is also determined. Font data is read from memory based on font code that is received from a control device and written in the conversion area per line unit in the order in which the font code is received and in a direction corresponding to toward the open side of the conveyance path and away from the guided side of the conveyance path. The recording head is controlled to record the font data in the conversion area on the slip.

16 Claims, 10 Drawing Sheets

(56) References Cited

FOREIGN PATENT DOCUMENTS

| JP | 06-143750 A | 5/1994 |
| JP | 07-244702 A | 9/1995 |
| JP | 08-297780 A | 11/1996 |
| JP | 10-067156 A | 3/1998 |
| JP | 2001-138596 A | 5/2001 |

* cited by examiner

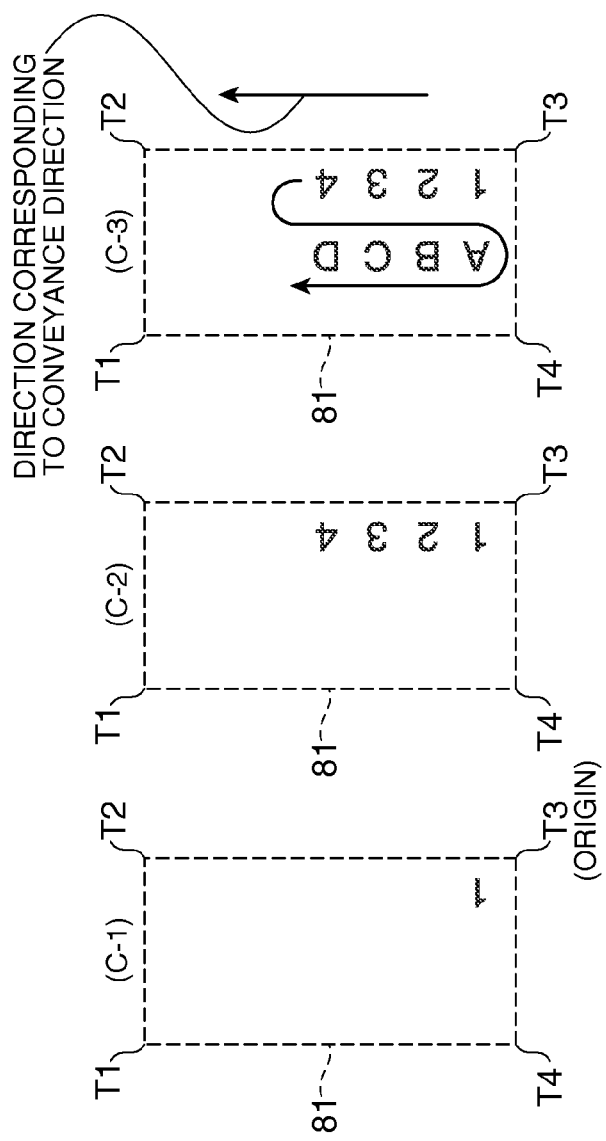
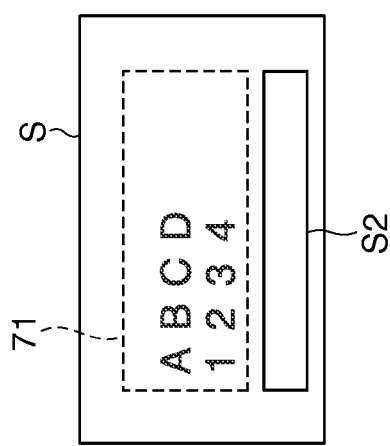
FIG. 9A
FIG. 9B
FIG. 9C

PRINTER AND PRINTER CONTROL METHOD

CROSS-REFERENCE TO RELATED APPLICATION(S)

This application is a continuation of, and claims priority under 35 U.S.C. §120 on, U.S. application Ser. No. 13/408,708, filed Feb. 29, 2012, which claims priority under 35 U.S.C. §119 on Japanese Patent Application No. 2011-045451, filed Mar. 2, 2011. The content of each such related application is incorporated by reference herein in its entirety.

BACKGROUND

1. Technical Field

The present invention relates to a printer that records on slips, and to a method of controlling the printer.

2. Related Art

Printers that record (print) images on, while conveying, checks or other slips are known from the literature. See, for example, Japanese Unexamined Patent Appl. Pub. JP-A-H07-244702.

Checks and similar slips are not all the same size; rather, they come in many different sizes. Setting and resetting the area to be recorded (conversion area) on the recording device in order to record at the desired position on slips of different sizes can be time-consuming and difficult for the user because complicated settings are required to identify the recording area. Because the size of the conveyed slips is not constant, being able to easily define the conversion area is necessary in a device that records images on slips.

SUMMARY

A printer and printer control method according to the invention enable easily defining the conversion area even when the size of the slips is not constant.

One aspect of the invention is embodied in a printer capable of coupling to a control device. Such printer comprises: a conveyance path, a first side of which guides a slip on a guided side and a second side of which is open; a conveyor that conveys the slip through the conveyance path in a conveyance direction; a recording head that records on the slip while moving in a direction intersecting the conveyance direction; a guide that extends in the conveyance direction; a guide extending in the conveyance direction and arranged on the first side of the conveyance path; a length detector disposed in the conveyance path that detects the length of the slip in the conveyance direction; an interface that receives a code including a font code from the control device; a memory that stores font data corresponding to the font code; a storage that stores data, the storage including a conversion area configured to store the font data; and a controller that determines dimensions of the conversion area based on the detected length of the slip in the conveyance direction and a recording range of the recording head. The controller reads the font data from the memory based on the font code that the interface receives from the control device, writes the font data in the conversion area per line unit in the order in which the font code is received and in a direction corresponding to toward the second side of the conveyance path and away from the first side of the conveyance path, and controls the recording head to record the font data in the conversion area on the slip.

This aspect of the invention can accommodate slips of different sizes and can appropriately define the range of the recordable conversion area formed in the storage area referenced to a particular position and can create a conversion area for different size slips, by conveying the slip with one edge against the guide, reflecting the actual length of the slip in the conveyance direction and the length of recording head movement. The converted print data can therefore be recorded to slips of difference sizes referenced to a position corresponding to one side of the slip. Easily recording to a desired position on slips of different sizes is therefore possible.

In a printer according to another aspect of the invention, the length detector includes a media detection sensor that detects if the slip is present; and the length detector detects the length of the slip in the conveyance direction based on the distance the slip is conveyed by the conveyor and output from the media detection sensor.

This aspect of the invention enables detecting the length of the slip in the conveyance direction while conveying the slip to read magnetic ink characters, which is a process applied to slips such as checks; therefore, there is no need to convey the slip specifically to detect the length of the slip, thus making processing more efficient.

In a printer according to another aspect of the invention, the conversion area is a rectangular area, and of the four vertices defining the rectangular area, the controller writes the font data to the conversion area using as the origin the vertex corresponding to a point on the slip that is closest to a trailing edge of the slip in the conveyance direction and closest to the guided side of the slip relative to points on the slip corresponding to the other vertices.

This aspect of the invention enables efficiently writing converted print data to a conversion area reflecting that all slips are not the same width, and enables easily recording to the desired position.

In a printer according to another aspect of the invention, the control unit writes the font data from the origin in the conveyance direction, which is the write direction.

This aspect of the invention enables efficiently writing the font data to a conversion area reflecting that all slips are not the same length in the conveyance direction, and enables easily recording to the desired position.

In a printer according to another aspect of the invention, when writing the font data for one line to the conversion area in the write direction, if part of the font data for the one line will not fit in the one line, the controller inserts a line change and continues writing the font data for the one line to the conversion area.

This aspect of the invention writes to the conversion area by automatically changing the line of characters contained in the text string, and can prevent not recording some of the characters in the text string on the slip.

In a printer according to another aspect of the invention, the recording head is mounted and moved on a carriage; and the direction the controller changes the line is the direction of carriage movement away from the first side of the conveyance path and toward the second side thereof.

When recording an image of a text string on a check, this aspect of the invention enables recording in the conveyance direction, which is the same direction as the MICR line, while appropriately inserting line changes to the text string recorded on the check or other slip.

In a printer according to another aspect of the invention, the controller writes the font data to the conversion area in a direction enabling reading the text in a direction toward the second side of the conveyance path.

Reflecting that all slips do not have the same length in the conveyance direction, this aspect of the invention enables efficiently writing and recording in a direction that enables reading referenced to a position on the one side of the slip, and enables easy reading.

Another aspect of the invention is embodied in a printer capable of coupling to a control device. Such printer comprises: a conveyance path, a first side of which guides a slip on a guide side and a second side of which is open; a conveyor that conveys the slip through the conveyance path in a conveyance direction; a recording head that records on the slip while moving in a direction intersecting the conveyance direction; a guide that extends in the conveyance direction and is arranged on the first side of the conveyance path; and a controller that controls (i) font code received from the control device for converting font data, (ii) the recording head to record the font data on the slip with reference to a position on the guided side of the slip in a recording range of the recording head in a direction intersecting the conveyance direction, and (ii) the recording range to determine per line unit in the conveyance direction in the order in which the font code is received from a position on the guided side of the slip to a position on a non-guided side of the slip.

This aspect of the invention can appropriately define the recording position referenced to a position corresponding to the guided side of the slip, and can record to an appropriate position reflecting that the slip size is not constant, by conveying the slip with one edge of the slip against a guide extending in the conveyance direction, reflecting the actual length of the slip in the conveyance direction and the length of recording head movement. Because the guide defines one side of the conveyance path in the conveyance direction while the other side of the conveyance path is open, the printer can accommodate slips of different sizes, large slips that protrude from the conveyance path can also be loaded and conveyed. The font data can therefore be recorded to slips of difference sizes referenced to a position corresponding to guided side of the slip. Easily recording to a desired position on slips of different sizes is therefore possible.

In a printer according to another aspect of the invention, when recording the font data in the conveyance direction of the slip and the line changes, the controller controls the recording head to change the line in a direction away from the first side of the conveyance path and toward the second side of the conveyance path.

By recording characters in the order received and inserting line changes at appropriate locations, content can be recorded in a natural arrangement.

In a printer according to another aspect of the invention, when recording the font data in the conveyance direction of the slip, the controller controls the recording head to record in a direction enabling reading the text away from the first side and toward the second side of the conveyance path.

This configuration enables recording with a natural arrangement that is easy to read from the one side of the slip.

Another aspect of the invention is a method of controlling a printer capable of coupling to a control device. The method comprises steps of: conveying a slip through a conveyance path that has a guide on one side and is open on the other side, the guide extending in the conveyance direction and arranged to guide a guided side of the slip as it is conveyed through the conveyance path; detecting the length of the slip in the conveyance direction as the slip is conveyed through the conveyance path; receiving a code including a font code from the control device; acquiring, based on the font code, font data from a memory that stores the font data corresponding to the font code; determining a recording range of a recording head per line unit in the conveyance direction in the order in which the font code is received from a position on the guided side of the slip to a position on a non-guided side of the slip; and recording the font data on the slip with reference to the position on the guided side of the slip in the recording range in a direction intersecting the conveyance direction.

The method according to this aspect of the invention enables appropriately defining the recording position referenced to a particular position, and recording to an appropriate position reflecting that the slip size is not constant, by conveying the slip with one edge of the slip against a guide extending in the conveyance direction, reflecting the actual length of the slip in the conveyance direction and the length of recording head movement. Because a guide that defines one side is disposed along the conveyance direction on one side of the conveyance path and the other side of the conveyance path is open to accommodate slips of different sizes, large slips that protrude from the conveyance path can also be loaded and conveyed. The font data can therefore be recorded to slips of difference sizes. Easily recording to a desired position on slips of different sizes is therefore possible.

A control method according to another aspect of the invention when recording the font data in the conveyance direction of the slip and the line changes, the line is changed in a direction away from the guide side and toward the open side of the conveyance path.

By recording characters in the order received and inserting line changes at appropriate locations, this control method enables recording content in a natural arrangement.

In a control method according to another aspect of the invention, when recording the font data in the conveyance direction of the slip, recording proceeds in the direction enabling reading the text in a direction toward the open side of the conveyance path.

This control method enables recording with a natural arrangement that is easy to read from the one side of the slip.

In any of the printers or control method, when a code indicating a new line is received or when one line is full with font data, the line is changed in a direction away from the guided side of the conveyance path and toward the open side.

Effects of the Invention

The invention enables forming a conversion area reflecting that all slips are not the same size. Other effects, attainments, and attributes are described below with reference to the accompany figures.

BRIEF DESCRIPTION OF THE DRAWINGS

FIGS. 9A, 9B and 9C illustrate steps SD4 and SC2 in FIGS. 8A and 8B in detail.

DESCRIPTION OF EMBODIMENTS

Preferred embodiments of the present invention are described below with reference to the accompanying figures.

Figure 1:
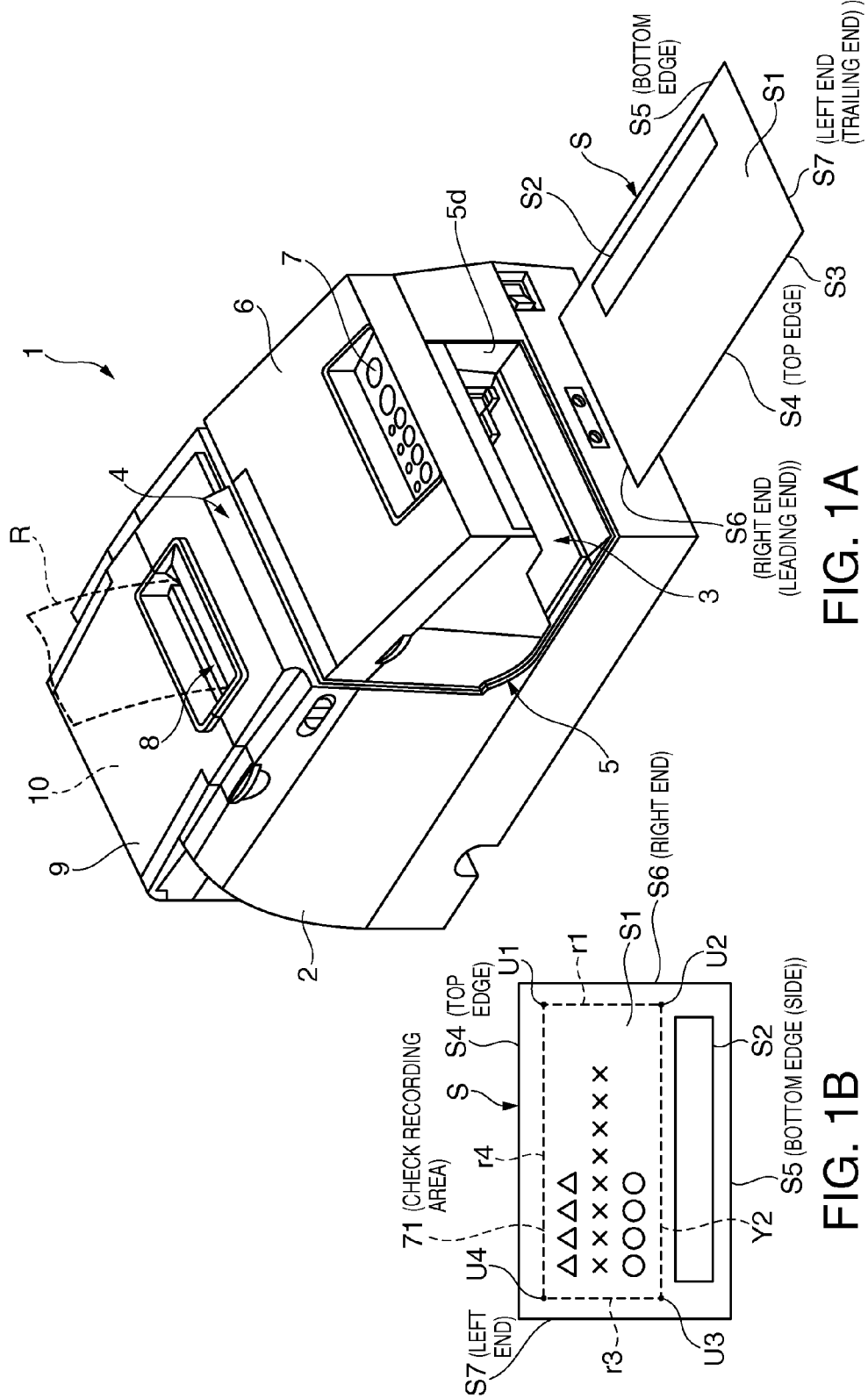
FIG. 1A is an external oblique view of a printer according to the invention.
FIG. 1B schematically shows the face S1 of a check S.

FIG. 1A is an external oblique view showing a printer 1 (recording device) rendering printer system 300 (FIG. 4, FIG. 6) according to a preferred embodiment of the invention. The printer 1 reads magnetic ink characters S2 (also called MICR (magnetic ink character recognition) characters) that are recorded on the face S1 (recording surface) of a check S, and records images on the face S1 and/or back S3 of the check S. The printer 1 also stores roll paper R, which is thermal paper wound in a roll, inside and records to the roll paper R.

As shown in FIG. 1A, the printer 1 has a basically box-shaped main case 2 with a media insertion opening 3 for inserting checks S formed with a specific width widthwise to the printer at the front left side of the main case 2. A media exit 4, from which the processed check S is discharged, is formed with a specific width, extending widthwise with respect to the printer, in the top of the main case 2 midway between the front and back ends of the printer. A media conveyance path 5 that extends from the media insertion opening 3 towards the back of the printer and then curves upward is formed between the media insertion opening 3 and the media exit 4.

The media insertion opening 3, media exit 4, and media conveyance path 5 are formed open to the left side of the main case 2 (as seen in FIG. 1A) so that checks S that are wider than the media insertion opening 3, media exit 4, and media conveyance path 5 can also be conveyed. A guide 5d that extends along the media conveyance path 5 is formed on the right side of the media conveyance path 5, and the right side of the media conveyance path 5 is closed off by this guide 5d.

FIG. 1B schematically describes face S1 of a check S. As shown in FIG. 1B, magnetic ink characters S2 are recorded near the bottom edge S5 (one side) of the face S1 of the check S extending along the bottom edge S5.

The size (the length of the long side and the length of the short side (the width herein)) of the checks S processed by the printer 1 is not constant. However, the distance from the bottom edge S5 of each check S (one side of the slip) to the magnetic ink characters S2 is determined according to a known standard, and is substantially constant.

As shown in FIG. 1A, when a check S is inserted to the media insertion opening 3 of the printer 1, check S is inserted from the right end S6 with the front and back positioned so that the face S1 is up and the back S3 is down, and the right and left positioned so that the top edge S4 is on the left and the bottom edge S5 is on the right.

The check S is inserted along the guide 5d with the bottom edge S5 touching the guide 5d. As a result, when the check S is conveyed through the media conveyance path 5, the check S can be conveyed in the conveyance direction (the direction indicated by arrow Y1 in FIG. 3) or the opposite direction (the direction indicated by arrow Y2 in FIG. 3) with the bottom edge S5 of the check S following the guide 5d.

As described above, the distance from the bottom edge S5 to the magnetic ink characters S2 is substantially the same for all checks S. Therefore, the length of the right-left separation between the guide 5d and the magnetic ink characters S2 of a check S conveyed through the media conveyance path 5 with the bottom edge S5 following the guide 5d is substantially constant regardless of the size of the check S. A MICR head 42 for reading the magnetic ink characters S2 is disposed to a position opposite the position of the magnetic ink characters S2 on a check S conveyed through the media conveyance path 5. The MICR head 42 is disposed to a position separated from the guide 5d by the same distance as the distance from the bottom edge S5 of the check S to the magnetic ink characters S2.

A front cover 6 covers the top of the main case 2 in front of the media exit 4, and an operating panel 7 for operating the printer 1 is disposed at the front end part of the front cover 6. A roll paper exit 8 of a specific width from which the printed roll paper R is discharged is disposed to the top of the main case 2 widthwise to the printer behind the media exit 4.

An access cover 9 is disposed to the top of the main case 2 behind the roll paper exit 8, and the access cover 9 is pivotably attached at the back end to the main case 2. When the access cover 9 opens, the roll paper compartment 10 that holds the roll paper R is exposed, and the roll paper R can be replaced. The roll paper R is continuous thermal paper wound around a core into a roll.

Figure 2:
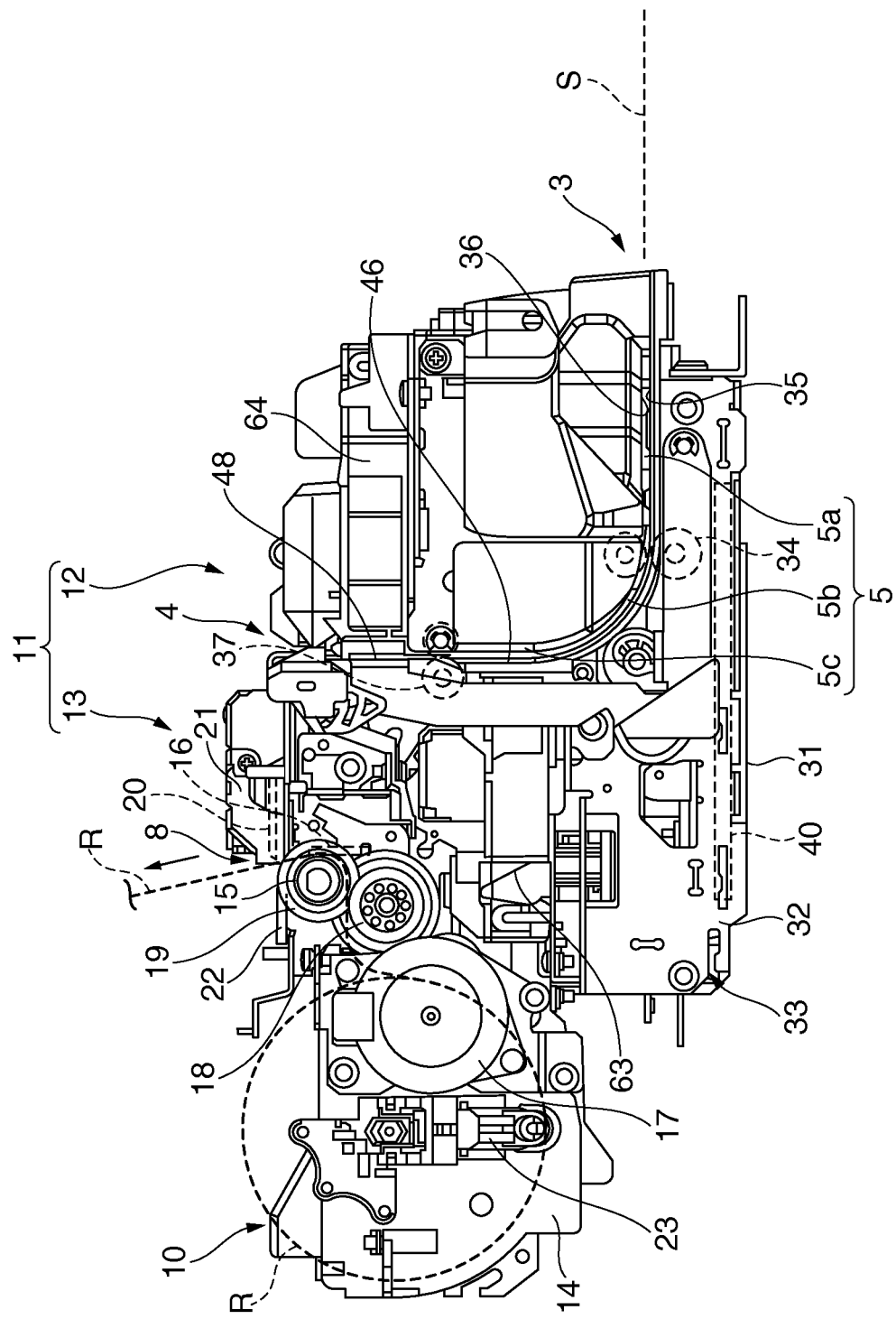
FIG. 2 is a side view showing the main unit of the printer.

FIG. 2 is a schematic side view showing the main unit of the printer 1. FIG. 2 shows the main unit with outside parts such as the main case 2, front cover 6, and access cover 9 removed. As shown in FIG. 2, the printer 1 has a main unit 11, and the main unit 11 includes a slip print unit 12 for printing checks S, and a roll paper print unit 13 for printing on roll paper R, rendered in unison.

The roll paper print unit 13 includes a pair of left and right side frames, left side frame 14 and a right side frame (not shown in the figure), and a roll paper holder (not shown in the figure) that is disposed between these side frames and forms the the floor, front, and back of the roll paper compartment 10. This roll paper holder holds the roll paper R freely rotatable, and enables the roll paper R to roll freely inside the roll paper compartment 10.

A platen roller 15 extends freely rotatably between the left and right side frames near the roll paper exit 8. A thermal head 16 is disposed in front of the platen roller 15 at a position opposite the platen roller 15, and the thermal head 16 has a plurality of heating resistors on the surface opposing the platen roller 15. The leading part of the roll paper R stored in the roll paper compartment 10 is held between the platen roller 15 and thermal head 16, and is conveyed toward the roll paper exit 8 when the platen roller 15 turns. As the roll paper R passes between the platen roller 15 and thermal head 16, text and images are recorded on the roll paper R by heat output from the thermal head 16. A roll paper feed motor 17 is disposed to the left side frame 14, and rotation from the roll paper feed motor 17 is transferred through an intermediate gear 18 to a drive gear 19 disposed coaxially to the platen roller 15, and the platen roller 15 turns.

An automatic cutter unit 21 having an internal movable knife 20 and a cutter drive motor 24 (see FIG. 4) that advances and retracts the movable knife 20 is disposed above the platen roller 15, and a fixed knife 22 is disposed behind the automatic cutter unit 21 with the roll paper exit 8 therebetween. The leading end part of the roll paper R passes between the movable knife 20 and fixed knife 22 to the roll paper exit 8, and to cut the roll paper R, the cutter drive motor 24 causes the movable knife 20 to move back towards the fixed knife 22 and cut the roll paper R together with the fixed knife 22.

A remaining roll paper sensor 23 that detects how much roll paper R is left inside the roll paper compartment 10 is also disposed to the left side frame 14.

As shown in FIG. 2, the slip print unit 12 includes a base frame 31, and a main frame 33 including a left side frame 32 and a right side frame (not shown in the figure) that rise vertically from the base frame 31. A pair of top and bottom paper guide members rendering a bottom guide surface 35 and a top guide surface 36 are disposed to the main frame 33, and the gap between the bottom guide surface 35 and top guide surface 36 is formed as the foregoing media conveyance path 5.

The media conveyance path 5 includes a horizontal conveyance path portion 5a that extends horizontally from the media insertion opening 3 toward the back of the printer, a curved conveyance path portion 5b that curves upward from the back end of the horizontal conveyance path portion 5a, and a vertical conveyance path portion 5c that extends upward from the top end of the curved conveyance path portion 5b and continues to the media exit 4.

A pair of first paper feed rollers 34 is disposed opposite each other on the bottom guide surface 35 and top guide surface 36 where the horizontal conveyance path portion 5a joins the curved conveyance path portion 5b, and a pair of second paper feed rollers 37 is disposed to the vertical conveyance path portion 5c opposite each other on the bottom guide surface 35 and top guide surface 36. The first paper feed rollers 34 and second paper feed rollers 37 rotate as respectively driven by the slip feed motor 38 (FIG. 4) and convey a check S. The first paper feed rollers 34 and second paper feed rollers 37 are also constructed so that one roller member can move to and away from the other roller member of the pair, and open and close the media conveyance path 5 as a result of the advance/retraction operation driven by the roller opening motor 39 (FIG. 4) that is connected to the one roller member. A control circuit board 40 that controls overall operation of the printer 1 based on a control program is also disposed to the base frame 31.

Figure 3:
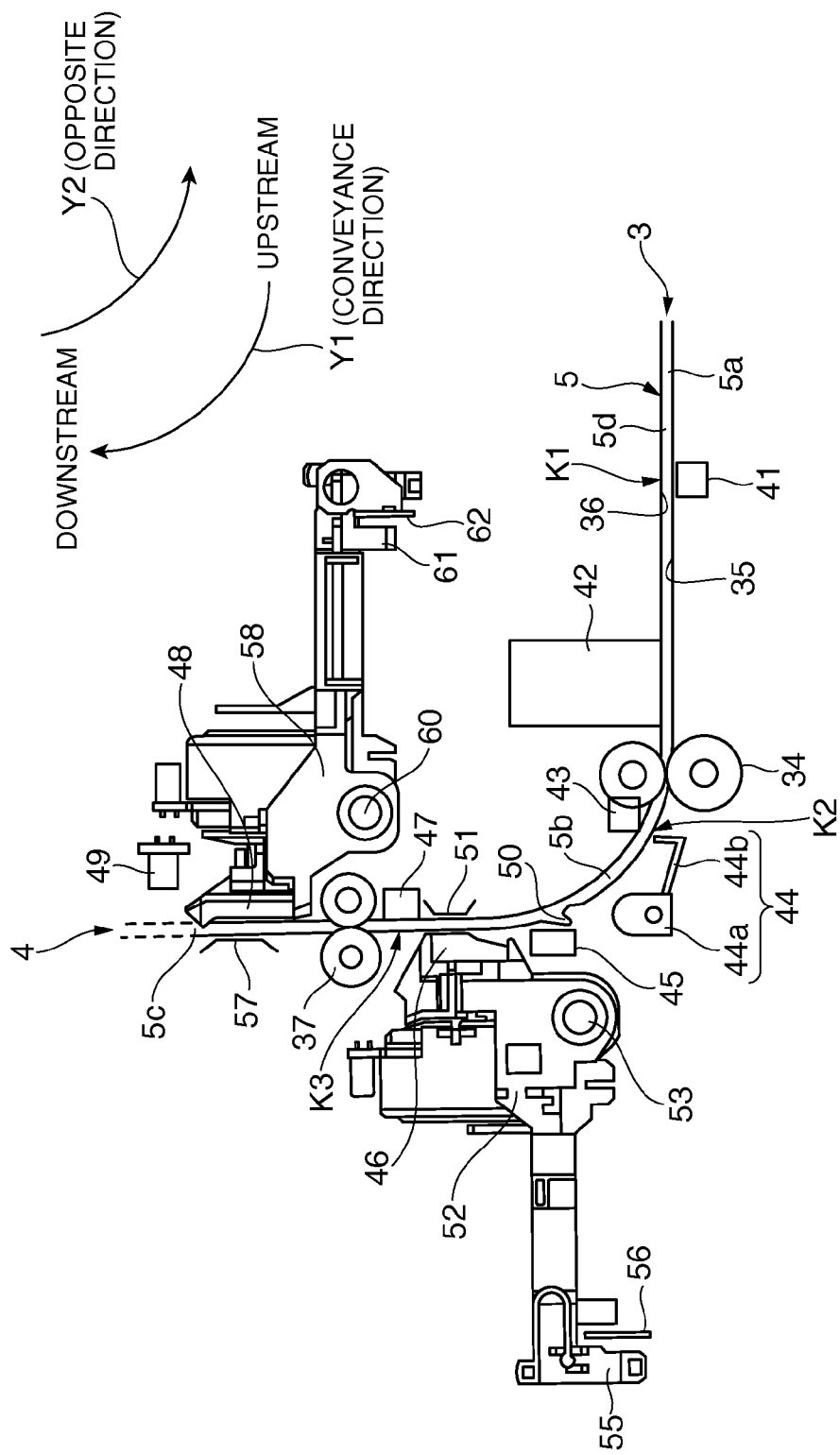
FIG. 3 shows various parts disposed along the media conveyance path.

FIG. 3 schematically describes members disposed to the media conveyance path 5. Disposed to the media conveyance path 5 in order from the media insertion opening 3 end are a BOF (bottom of form) sensor 41 (media detection sensor), MICR head 42 (reading unit), first paper feed rollers 34, TOF (top of form) sensor 43, alignment unit 44, a validation sensor 45 (a sensor that detects insertion of a check from the media exit 4; used when printing an approximately one line validation), a first printhead 46, a MOP (middle of paper pass) sensor 47, the second paper feed rollers 37, the second printhead 48, and an EJD (slip ejection detection) sensor 49.

The BOF sensor 41, TOF sensor 43, validation sensor 45, MOP sensor 47, and EJD sensor 49 may be transmissive or reflective photodetectors, for example, and contactlessly detect the presence of a check S at respective positions on the media conveyance path 5.

The BOF sensor 41 (media detection sensor) detects the trailing end of the check S inserted from the media insertion opening 3, and is disposed to the bottom guide surface 35 near the media insertion opening 3. As described above, in this embodiment of the invention the check S is inserted from the right end S6 to the media insertion opening 3 of the printer 1, and the trailing end of the check S is therefore the left end S7 of the check S.

As shown in FIG. 3, the BOF sensor 41 is disposed upstream in the conveyance direction from the MICR head 42 at a position K1 that the trailing end (left end S7) of the check S passes before the check S is conveyed in the conveyance direction to the completion of reading the magnetic ink characters S2 by the MICR head 42. More specifically, when the check S is conveyed in the conveyance direction and reading the magnetic ink characters S2 on the check S by the MICR head 42 in conjunction with media conveyance ends, the trailing end (left end S7) of the check S has already passed position K1.

The printer control unit 101 described below detects when the trailing end (left end S7) of the check S is at position K1 by detecting a change in BOF sensor 41 output from a state in which the check S is positioned at position K1 to a state in which the check S is not positioned at position K1.

The TOF sensor 43 is a sensor for detecting the leading end of a check S inserted from the media insertion opening 3. The TOF sensor 43 is disposed to the top guide surface 36 near the first paper feed rollers 34 at a position K2 on the media exit side of the first paper feed rollers 34. Based on output from the TOF sensor 43, the printer control unit 101 described below detects when the leading end (right end S6) of the check S is at position K2 by detecting a change from a state in which the check S is not positioned at position K2 to a state in which the check S is positioned at position K2.

While described in further detail below, a length detection unit 202 uses the output of the TOF sensor 43 and the BOF sensor 41 to detect the length in the conveyance direction of the check S being conveyed.

The EJD sensor 49 detects discharge of a check S processed by the slip print unit 12 from the media exit 4, and is disposed near the media exit 4.

The MOP sensor 47 detects the presence of a conveyed check S approximately in the middle of the media conveyance path 5, and is disposed to the top guide surface 36 near the second paper feed rollers 37 on the media insertion opening side.

The slip print unit 12 in this embodiment of the invention is configured to enable validation printing, which prints by the first printhead 46 and second printhead 48 to a check S inserted from the media exit 4, and after printing is completed discharges the check S again from the media exit 4. As a result, a pocket 50 is formed at the top end of the curved conveyance path portion 5b of the media conveyance path 5 so that the leading end of a check S inserted from the media exit 4 enters the pocket 50, which thus holds the check S and corrects check alignment. The validation sensor 45 detects insertion of the leading end of the check S to the pocket 50, and is disposed to a position facing the pocket 50.

The MICR head 42 (reading unit) is for reading magnetic ink characters S2 recorded on the face S1 of the check S, and is disposed to the top guide surface 36 in the horizontal conveyance path portion 5a of the media conveyance path 5. The validity of a check S is determined based on the data read by the MICR head 42. Because check S validity is determined before recording on the check S, the length of the check S can also be efficiently detected when reading the magnetic ink characters S2 with the MICR head 42 while conveying the check S.

The alignment unit 44 is for pausing and positioning the check S inserted from the media insertion opening 3, and is disposed near the TOF sensor 43 on the media exit side. The alignment unit 44 includes a solenoid or other type of stopper drive unit 44a, and a stopper 44b that moves in and out of the media conveyance path 5 according to the operation of the stopper drive unit 44a, and aligns a check S as a result of the leading end (right end S6) of the check S contacting this stopper 44b.

The first printhead 46 prints the endorsement information required by the business, such as a customer verification number, date, and amount, on the back S3 of the check S conveyed through the media conveyance path 5, and is a serial impact dot matrix (SIDM) printhead that prints by impelling recording wires against an ink ribbon and transferring ink from the ink ribbon to the slip.

Figure 4:
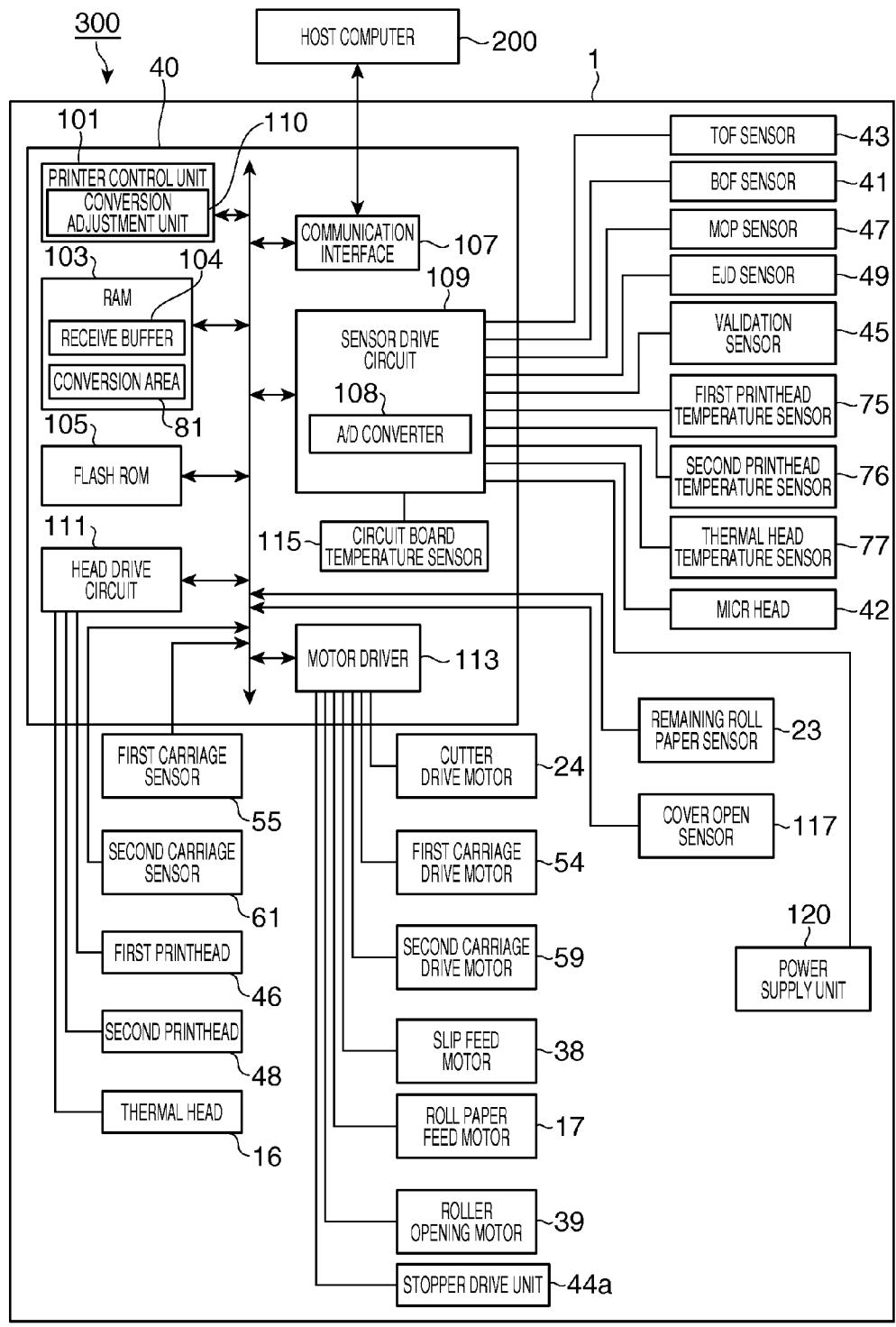
FIG. 4 is a block diagram showing the functional configuration of the printer.

The first printhead 46 is located at the bottom end of the vertical conveyance path portion 5c of the media conveyance path 5, and a first platen 51 is disposed widthwise to the main frame 33 (FIG. 2) at a position opposite the first printhead 46 with the vertical conveyance path portion 5c therebetween. The first printhead 46 is mounted on a first carriage 52 on the back side of the printer from the vertical conveyance path portion 5c. The first carriage 52 is disposed freely slidably on a first carriage shaft 53 extending substantially horizontally between the side frames of the main frame 33 (FIG. 2), and moves bidirectionally along the first carriage shaft 53 when driven by a first carriage drive motor (drive unit: FIG. 4) 54. The first carriage 52 is connected to the first carriage drive motor 54 by a timing belt (not shown in the figure). The first carriage drive motor 54 is a stepper motor, and can move the first carriage 52 only the distance equal to a desired number of steps as controlled by the control circuit board 40.

A first carriage sensor 55 that detects the position of the first carriage 52 is disposed on the bottom of the first carriage 52. This first carriage sensor 55 is a transmissive photodetector, and scans a first scale 56 disposed substantially parallel to the first carriage shaft 53 in conjunction with the bidirectional movement of the first carriage 52. Multiple slits of a specific width are formed in this first scale 56, and the first carriage sensor 55 detects change in the position of the first carriage 52 and detects the location of the first carriage 52 (first printhead 46) by acquiring optical signals passing through these slits while scanning the first scale 56. Note that in this embodiment of the invention power is supplied to the first carriage sensor 55 only while the first carriage drive motor 54 is driven, and because the power supply to the first carriage sensor 55 is interrupted while the first carriage drive motor 54 is stopped, power consumption can be reduced while waiting and energy efficiently can be improved.

The second printhead 48 is for printing face information such as the payee, date, and amount on the face S1 of a check S conveyed through the media conveyance path 5, and like the first printhead 46 is a SIDM printhead.

The second printhead 48 is located above and to the front of the printer from the first printhead 46 with the vertical conveyance path portion 5c therebetween. A second platen 57 is disposed extending widthwise to the main frame 33 (FIG. 2) at a position opposite the second printhead 48 with the vertical conveyance path portion 5c therebetween. The second printhead 48 is carried on a second carriage 58 like the first printhead 46, and the second carriage 58 moves bidirectionally along a second carriage shaft 60 as driven by a second carriage drive motor 59. A second carriage sensor 61 is disposed on the bottom of the second carriage 58, and this second carriage sensor 61 scans a second scale 62 disposed substantially parallel to the second carriage shaft 60 in conjunction with the reciprocal movement of the second carriage 58. Note that, like the first carriage drive motor 54, the second carriage drive motor 59 is a stepper motor.

A first ink ribbon cassette 63 (FIG. 2) and a second ink ribbon cassette 64 (FIG. 2), which hold ink ribbons respectively conveyed between the first printhead 46 and first platen 51, and the second printhead 48 and second platen 57, are removably installed to the main frame 33.

FIG. 4 is a block diagram that shows the functional configuration of a printer system 300 including a printer 1 and a printer system 300 (control device) that controls the printer 1, and more particularly shows the printer 1 in detail.

In this embodiment of the invention the printer 1 and host computer 200 work together, functioning as a printer system 300.

As shown in FIG. 4, the control system of the printer 1 is composed of drive units including different motors and various sensors connected to the control circuit board 40.

The control circuit board 40 also has a printer control unit 101 that includes a CPU, and the CPU runs a control program to control parts of the printer 1. The printer control unit 101 includes a conversion adjustment unit 110, and the conversion adjustment unit 110 is described further below.

Disposed to the control circuit board 40 are RAM 103 (storage area) for temporarily storing programs executed by the printer control unit 101 and processed data; flash ROM 105 that stores the basic control program run by the printer control unit 101 and settings data; a communication interface 107 for exchanging commands and data with the host computer 200 that controls the printer 1; a sensor drive circuit 109 that includes an A/D converter 108 and converts the output values of sensors in the printer 1 to digital data, and outputs to the printer control unit 101; a head drive circuit 111 that drives the printheads of the printer 1; and a motor driver 113 that drives the motors of the printer 1, and these different parts are connected so that they can communicate with each other. Note, further, that the form in which the functional parts of the control circuit board 40 are packaged is not specifically limited, and different functional parts could be packaged as individual semiconductor devices, or the functions of plural functional parts could be combined into a system-on-a-chip (SOC) device, for example.

A circuit board temperature sensor 115 that detects the temperature of the motor driver 113 is also mounted on the control circuit board 40. The circuit board temperature sensor 115 is a thermistor disposed to the control circuit board 40 on the back side of where the motor driver 113 is mounted, or near the motor driver 113.

Also connected to the printer control unit 101 are a remaining roll paper sensor 23 that detects if the remaining amount of roll paper R stored in the roll paper compartment 10 (FIG. 1A) is greater than or equal to a certain level, a cover open sensor 117 that detects if the access cover 9 is open, and the first carriage sensor 55 and second carriage sensor 61 described above. The remaining roll paper sensor 23 is a sensor switch that turns on when the outside diameter of the roll paper R is greater than or equal to a specific level, the cover open sensor 117 is a sensor switch that turns on when the access cover 9 opens, and both sensors output high/low according to the on/off state of the switch. The first carriage sensor 55 and second carriage sensor 61 are photointerrupters, for example, and the output value switches high/low according to whether or not the light detected by the photodetection unit exceeds an internal threshold value.

The printer control unit 101 controls parts mounted on the control circuit board 40 by reading and running a basic control program stored in flash ROM 105. Based on the sensor output values input through the sensor drive circuit 109, and the output values of the remaining roll paper sensor 23, cover open sensor 117, first carriage sensor 55, and second carriage sensor 61, the printer control unit 101 monitors operation of the printer 1, drives the heads using the head drive circuit 111, and operates the motors using the motor driver 113 to print on the face S1 and back S3 of the check S, read the MICR line, and perform printing and other operations on the roll paper R.

RAM 103 provides working memory for temporarily storing programs and data used in the operation of the printer control unit 101.

A receive buffer 104 that temporarily stores commands and data received by the communication interface 107 from the host computer 200 is provided in RAM 103. The printer control unit 101 reads and executes the commands stored in the receive buffer 104 in the order received.

A conversion area 81 into which the images to be recorded on the face S1 of the check S are converted is formed in RAM 103. This conversion area 81 is further described below.

The sensor drive circuit 109 is connected to the BOF sensor 41, TOF sensor 43, validation sensor 45, MOP sensor 47, EJD sensor 49, and circuit board temperature sensor 115, converts the output values from these sensors to digital data, and outputs to the printer control unit 101. The sensor drive circuit 109 is connected to the MICR head 42, and outputs the output values of the MICR head 42 as digital data to the printer control unit 101 while the magnetic ink characters S2 recorded on the check S are being read by the MICR head 42.

Also connected to the sensor drive circuit 109 are a first printhead temperature sensor 75, second printhead temperature sensor 76, and thermal head temperature sensor 77. The first printhead temperature sensor 75 is mounted on the first printhead 46, and the second printhead temperature sensor 76 is mounted on the second printhead 48. The first printhead temperature sensor 75 and second printhead temperature sensor 76 are disposed near the solenoid used to impel the recording wires, and detect the temperature of and around the solenoid.

The thermal head temperature sensor 77 is disposed near the heat elements of the thermal head 16, and detect the temperature of the heat elements. The first printhead temperature sensor 75, second printhead temperature sensor 76, and thermal head temperature sensor 77 are thermistors, and the sensor drive circuit 109 outputs the output values of the first printhead temperature sensor 75, second printhead temperature sensor 76, and thermal head temperature sensor 77 as digital data to the printer control unit 101. Based on the temperature obtained from the output values of the first printhead temperature sensor 75, second printhead temperature sensor 76, and thermal head temperature sensor 77, the printer control unit 101 controls the thermal head 16, first printhead 46, and second printhead 48. More specifically, if the temperature of the thermal head 16, first printhead 46, or second printhead 48 exceeds a previously set threshold value, the printer control unit 101 unconditionally pauses operation of that head. In this case, the printer control unit 101 resumes operation when the temperature of the head that was stopped goes below a set temperature.

The head drive circuit 111 records on a check S by energizing the solenoid coil that impels the recording wires of the first printhead 46 or second printhead 48 as controlled by the printer control unit 101. In addition, the head drive circuit 111 applies heat to and records on the recording surface of the roll paper R by energizing the heat elements (not shown in the figure) of the thermal head 16 as controlled by the printer control unit 101.

The motor driver 113 outputs drive power and drive pulses as controlled by the printer control unit 101 to the motors, including the roll paper conveyance motor 17, cutter drive motor 24, slip feed motor 38, roller opening motor 39, stopper drive unit 44a, first carriage drive motor 54, and second carriage drive motor 59, which are stepper motors. The drive power that the motor driver 113 supplies to the motors is the 24-V DC supply power supplied by the power supply unit 120.

In this embodiment of the invention the printer control unit 101 functions as a conveyance unit that drives the slip feed motor 38 and conveys a check S as controlled by the host control unit 201. As described above, the printer control unit 101 that functions as the conveyance unit conveys a check S after aligning the bottom edge S5 of the check S to the guide 5d.

The power supply unit 120 supplies DC power to the drive units of the printer 1 shown in FIG. 4, including the printheads (first printhead 46, second printhead 48, thermal head 16), the motors (cutter drive motor 24, first carriage drive motor 54, second carriage drive motor 59, slip feed motor 38, roll paper conveyance motor 17, and roller opening motor 39), the stopper drive unit 44a, and the control circuit board 40. Power from the power supply unit 120 is also supplied to the sensors of the printer 1 through the control circuit board 40 or through the sensor drive circuit 109 mounted on the control circuit board 40.

The output voltage of the power supply unit 120 is input to the sensor drive circuit 109, and the sensor drive circuit 109 outputs the voltage of the power supply voltage from the power supply unit 120 as a digital value to the printer control unit 101. The printer control unit 101 determines based on this digital data if the voltage from the power supply unit 120 is in the normal range.

Figure 5:
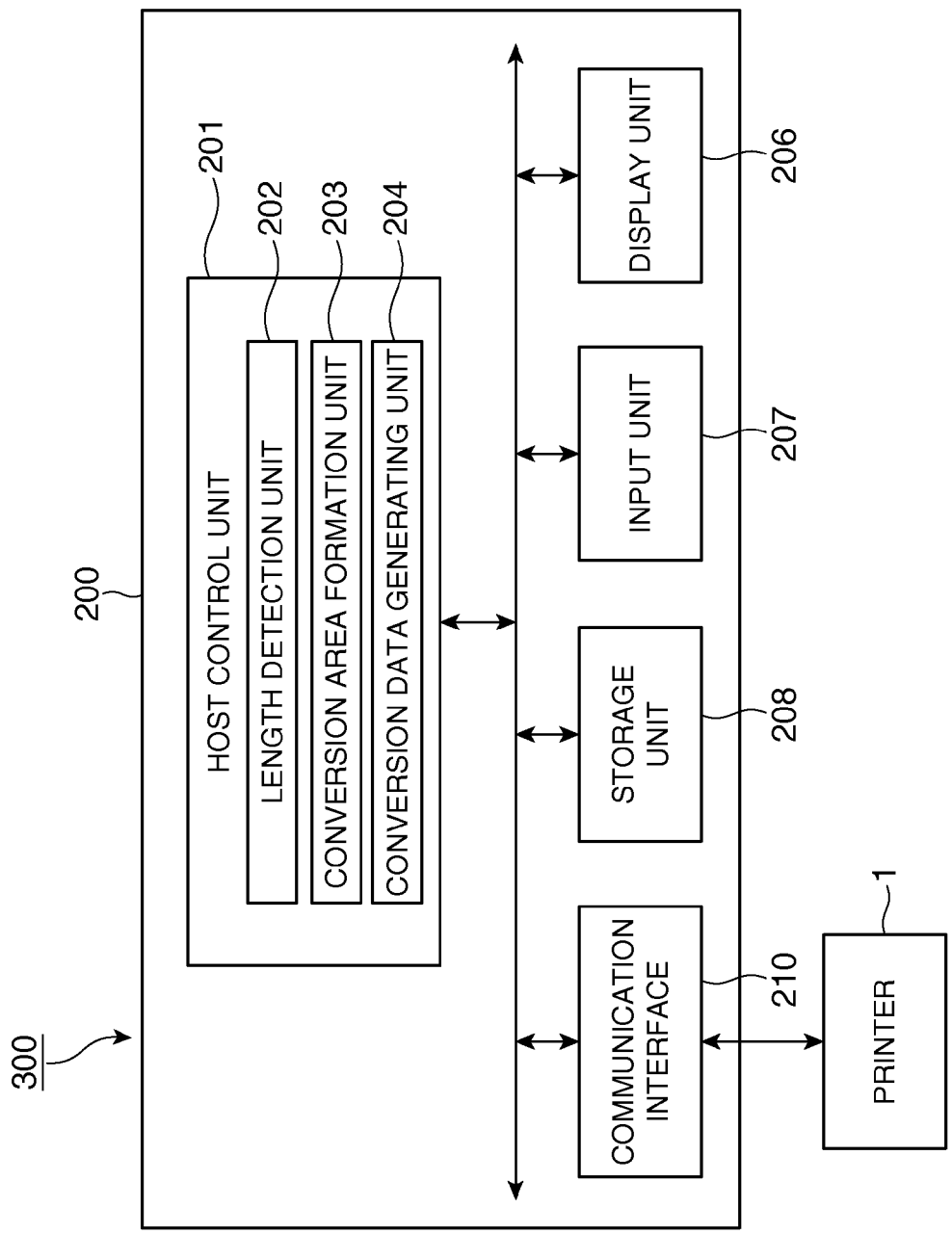
FIG. 5 is a block diagram showing the functional configuration of the host computer.

FIG. 5 is a block diagram showing in detail the functional configuration of the host computer 200 in this printer system 300. As shown in FIG. 5, the host computer 200 has a host control unit 201. The host control unit 201 includes a length detection unit 202, conversion area formation unit 203, and conversion data generating unit 204, which are further described below.

A display unit 206 includes a display panel such as an LCD panel, and presents information on the display panel as controlled by the host control unit 201.

The input unit 207 is connected to input devices such as operating switches or a keyboard, detects operation of the input device, and outputs to the host control unit 201.

The storage unit 208 is a hard disk drive, EEPROM, or other type of nonvolatile memory, and rewritably stores data. The storage unit 208 stores at least device drives, which is a control program group, for controlling the printer 1.

The communication interface 210 communicates with the printer using a known communication standard as controlled by the host control unit 201.

The operation of the printer system 300, and particularly operation related to check processing, is described next.

Figures 6A, 6B:
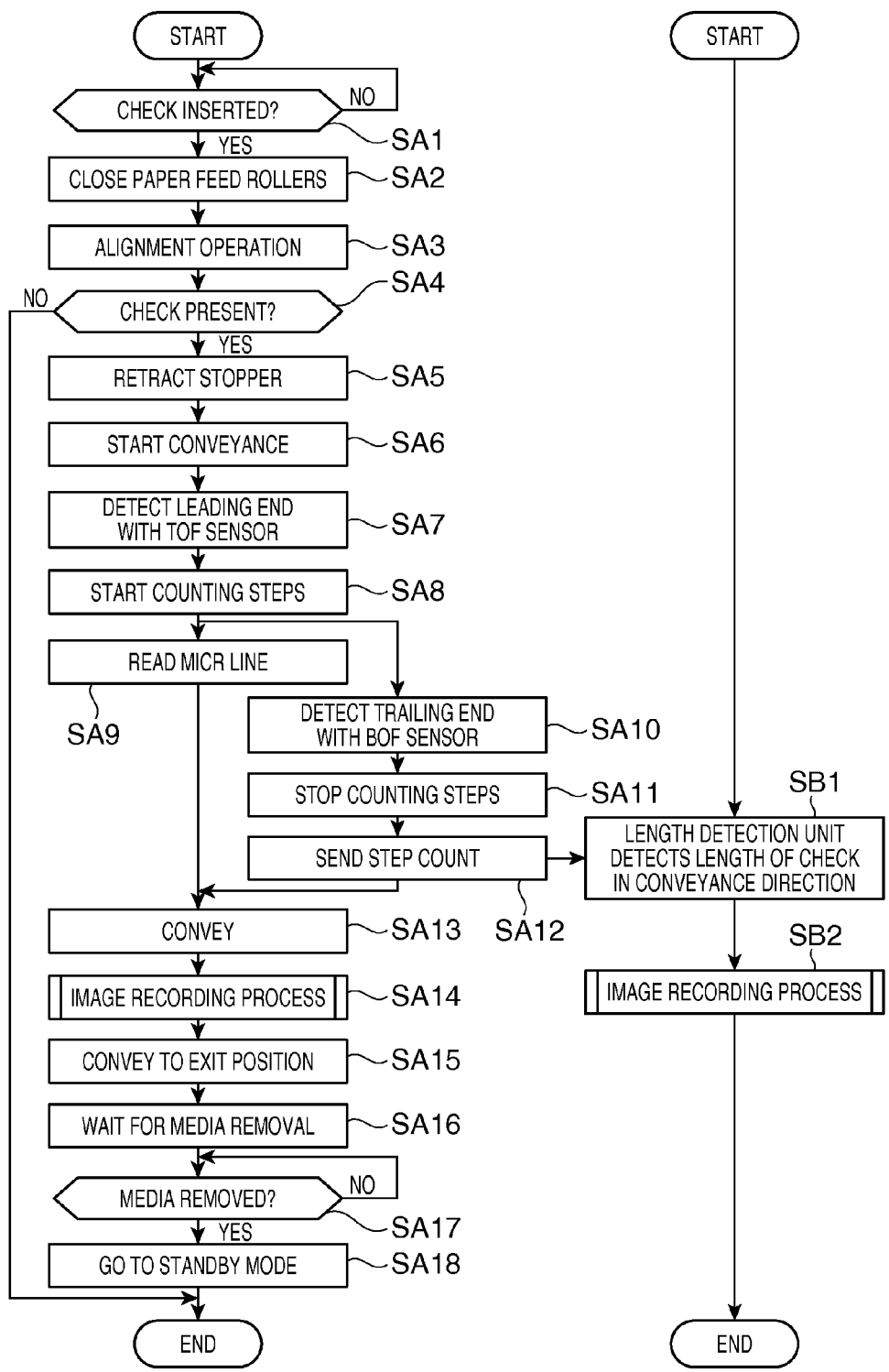
FIGS. 6A and 6B are flow charts of printer operation.

FIG. 6 is a flow chart describing the operation of the printer system 300 related to check processing, (A) showing the operation of the printer 1, and (B) showing the operation of the host computer 200.

Note that in the following description the functions of the length detection unit 202, conversion area formation unit 203, conversion data generating unit 204, and conversion adjustment unit 110 are achieved by the cooperation of hardware and software, such as by a CPU executing a specific program. More specifically, the functions of the length detection unit 202, conversion area formation unit 203, and conversion data generating unit 204 are rendered by a device driver (printer driver) installed on the host computer 200.

Note that for brevity in the description of FIG. 6 an image is recorded to the face S1 of a check S, and an image is not recorded to the back S3 of the check S.

When the power turns on, the printer 1 turns on and enters a standby mode. In the standby mode, the printer control unit 101 controls the roller opening motor 39, moves the first paper feed rollers 34 and second paper feed rollers 37 to the open positions, and enables inserting a check S to the media insertion opening 3. The printer control unit 101 operates the stopper drive unit 44a to advance the stopper 44b into the media conveyance path 5.

After entering the standby mode, the printer control unit 101 monitors if a check S was inserted based on the output of the BOF sensor 41 (step SA1).

If insertion of a check S is detected (step SA1 returns Yes), the printer control unit 101 controls the motor driver 113 to drive the roller opening motor 39 and move the first paper feed rollers 34 and second paper feed rollers 37 to the closed position, and hold the check S with the first paper feed rollers 34 (step SA2).

With the stopper 44b intervening in the media conveyance path 5, the printer control unit 101 operates the slip feed motor 38 to rotationally drive the first paper feed rollers 34, and performs an operation moving the check S forward and reverse plural times (step SA3). This operation pushes the check S against the stopper 44b for alignment.

The printer control unit 101 then checks for the presence of a check S based on BOF sensor 41 output (step SA4), and if a check S is not detected, determines that an error occurred or the check S was removed, and stops the process.

However, if the BOF sensor 41 detects a check S (step SA4 returns Yes), the printer control unit 101 drives the stopper drive unit 44a to retract the stopper 44b from the media conveyance path 5 (step SA5).

After the stopper 44b retracts, the printer control unit 101 controls the slip feed motor 38 and starts conveying the check S in the conveyance direction by the first paper feed rollers 34 (step SA6). If immediately after conveyance starts the leading end (right end S6) of the check S is detected at position K2 based on the output of the TOF sensor 43 (step SA7), the printer control unit 101 starts counting the number of steps driven by the slip feed motor 38 (step SA8). Because the slip feed motor 38 is a stepper motor as described above, the number of steps is proportional to the number of rotations, and by counting the number of steps, the number of rotations the slip feed motor 38 has turned and the distance the check S was conveyed by the slip feed motor 38 can be detected.

The printer control unit 101 then conveys the check S by the first paper feed rollers 34, and reads the magnetic ink characters S2 on the check S based on MICR head 42 output during this time (step SA9).

As described above, the BOF sensor 41 is disposed to a position (position K1) that the trailing end (left end S7) of the check S passes before the check S is conveyed in the conveyance direction to the completion of reading the magnetic ink characters S2 by the MICR head 42. The printer control unit 101 therefore detects that the trailing end (left end S7) of the check S has passed the position K1 while the MICR head 42 is still reading magnetic ink character line.

The printer control unit 101 therefore monitors the output of the BOF sensor 41 parallel to the MICR head 42 reading the magnetic ink characters S2, and if the trailing end (left end S7) of the check S is detected passing the position K1 (step SA10), the printer control unit 101 stops counting the number of steps driven by the slip feed motor 38 that started in step SA8 (step SA11), and controls the communication interface 107 to output the count (the number of counted steps, referred to below as the "step count") to the length detection unit 202 of the host control unit 201 of the host computer 200 (step SA12).

As shown in (B) in FIG. 6, the length detection unit 202 to which the step count was input detects the length in the conveyance direction of the check S based on the step count (step SB1). The length of the check S in the conveyance direction is more specifically the distance between the right end S6 and left end S7 of the check S.

To describe the operation of the length detection unit 202 in step SB1 more specifically, the step count is the total number of steps the slip feed motor 38 is driven from detection of the leading end (right end S6) of the check S at position K2 based on TOF sensor 43 output to detection of the trailing end (left end S7) of the check S at position K1 based on BOF sensor 41 output. The conveyance distance of the check S calculated from the number of steps therefore corresponds to the length in the conveyance direction of the part of the check S passing position K2 when the trailing end of the check S is positioned at position K1.

Based thereon, the length detection unit 202 converts the number of steps to a conveyance distance in step SB1. Next, the length detection unit 202 detects the length of the check S in the conveyance direction by adding the distance on the media conveyance path 5 between position K1 and position K2 (equal to the length in the conveyance direction of the portion of the check S that has not passed position K2 when the trailing end of the check S is at position K1) to the calculated conveyance distance, and adding an appropriate correction amount.

In this embodiment of the invention the length detection unit 202 uses the output of the BOF sensor 41 to detect the length of the check S in the conveyance direction, and provides the following advantage.

More specifically, the BOF sensor 41 is disposed upstream in the conveyance direction from the MICR head 42 at a position K1 that the trailing end (left end S7) of the check S passes before the check S is conveyed in the conveyance direction to the completion of reading the magnetic ink characters S2 by the MICR head 42.

As a result, the printer control unit 101 detects when the trailing end (left end S7) of the check S passes position K1 while the MICR head 42 is reading the magnetic ink characters S2, and in conjunction therewith the length detection unit 202 detects the length of the check S in the conveyance direction.

In other words, in this embodiment of the invention the length detection unit 202 detects the length of the check S in the conveyance direction simultaneously and parallel to conveying the check S to read the magnetic ink characters S2 with the MICR head 42, and conveyance specifically to detect the length of the check S in the conveyance direction is therefore not necessary. As a result, processing is more efficient and the length of the process can be shortened. This effect is achieved by disposing the BOF sensor 41 to the position described above.

Referring to (A) in FIG. 6, when reading the magnetic ink characters S2 in step SA9, and outputting the step count in step SA12 executed parallel to step SA9, are completed, the printer control unit 101 executes the following steps to record an image on the face S1 of the check S.

More specifically, the printer control unit 101 first controls the slip feed motor 38 to convey the check S so that the leading end (right end S6) of the check S goes to the position K3 where the MOP sensor 47 is disposed while monitoring the output value of the MOP sensor 47 (step SA13).

Next, an image is recorded on the face S1 of the check S (steps SA14, SB2) such as by the printer control unit 101 receiving and recording data sent from the host control unit 201.

The process related to recording images on the face S1 in step SA14 is described next.

Figure 7A:
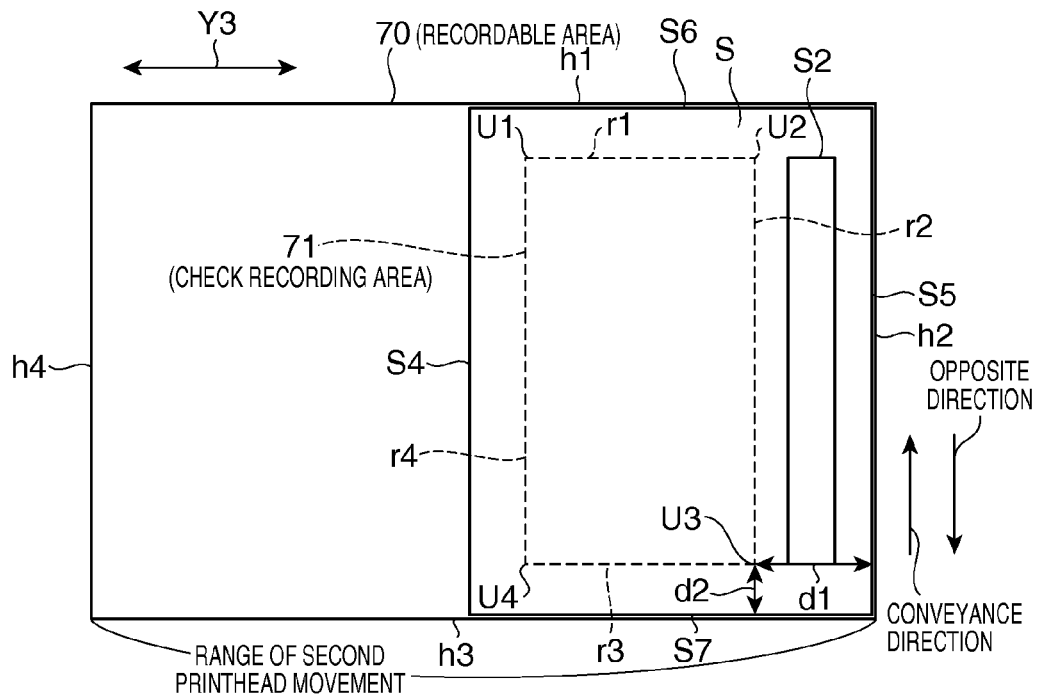
FIG. 7A illustrates the relative physical positions of the check S and the recordable area 70 of the second printhead 48.
Figure 7B:
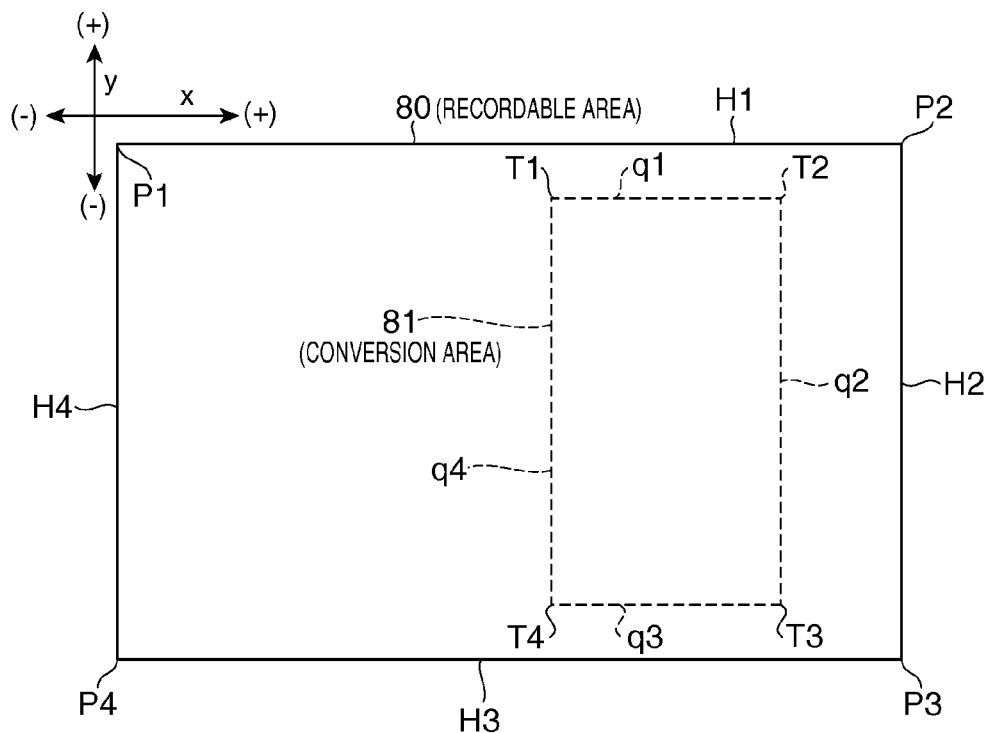
FIG. 7B illustrates the conversion area 81 created in RAM 103.

FIG. 7A and FIG. 7B describe the basic operation of the printer system 300 for recording an image on the face S1, FIG. 7A describing the relative physical positions of the check S and the recordable area 70 of the second printhead 48, and FIG. 7B describing the conversion area 81 reserved in RAM 103.

The basic operation for recording an image on the face S1 is described first with reference to FIG. 7A and FIG. 7B.

In FIG. 7A the recordable area 70 represents the area where image recording by the second printhead 48 is possible in relation to the check S. Because the second printhead 48 is a serial head that records images while scanning in a primary scanning direction (arrow Y3), the recordable area 70 is defined according to the range of movement in the primary scanning direction of the second printhead 48. In addition, because the check S is conveyed with the bottom edge S5 guided by the guide 5d in this embodiment of the invention, the check S is positioned in the recordable area 70 so that side h2 of the recordable area 70 (the side corresponding to the foregoing guide 5d) and bottom edge S5 overlap in the recordable area 70.

In addition, in FIG. 7A, the check recording area 71 (recording area) is the area where an image is actually recorded on the face S1 (recording surface) of the check S. As shown in FIG. 7A, this check recording area 71 is rectangular. The check recording area 71 is created for each check S.

In FIG. 7B, recordable area 80 is a recording area defined in RAM 103, and is a storage area corresponding to the foregoing recordable area 70.

Note that in the following description the recordable area 80 is converted to a virtual coordinate system in RAM 103. The relationship between the origin of the coordinate system, the x-axis, the y-axis, and the recordable area 80 is as shown in FIG. 7B, and the recordable area 80 is located in the fourth quadrant of the coordinate system indicated by the coordinate axes in the top left part of FIG. 7B. In FIG. 7B the direction to the right is positive on the x-axis, to the left is negative on the x-axis, to the top is positive on the y-axis, and to the bottom is negative on the y-axis.

The recordable area 80 is a storage area where bitmap data can be written, and dots (pixels) are defined according to the resolution of the second printhead 48. The bits defined in the recordable area 80 are uniquely defined as a relative position from the origin.

The coordinates of the recordable area 80 in RAM 103 are defined so that the shape of the recordable area 80 in RAM 103 corresponds to the shape of the recordable area 70.

More specifically, vertex P2 is defined so that side H1 extending in the positive direction on the x-axis from vertex P1 corresponds to side h1 of the recordable area 70 shown in FIG. 7A, which extends in the primary scanning direction and is positioned at the leading end (right end S6) of the check S.

Vertex P3 is defined so that side H2 extending in the negative direction on the y-axis from vertex P2 corresponds to side h2 of the recordable area 70 shown in FIG. 7A, which extends in the conveyance direction and is positioned on the bottom edge S5 (one side) side (guide 5d side) of the check S.

Vertex P4 is defined so that side H3 extending in the negative direction on the x-axis from vertex P3 corresponds to side h3 of the recordable area 70 shown in FIG. 7A, which extends in the primary scanning direction and is positioned on the trailing end (left end S7) side of the check S.

Side h3 is the range of movement of the second printhead 48 mounted on the second carriage 58, and is set and stored in advance in a recording unit such as flash ROM 105.

In FIG. 7B, the conversion area 81 is a storage area corresponding to the check recording area 71. In this embodiment of the invention, images are recorded to the check recording area 71 based on the data written to conversion area 81 after all image data to be recorded in the check recording area 71 of the check S is converted (to bitmap data in this embodiment of the invention) and written to the conversion area 81 defined in RAM 103.

This recordable area 80 may correspond to the storage area to which one page of image data is written in a page mode. In the page mode the host control unit 201 sends commands to the printer control unit 101 and reserves the conversion area 81 in page units. Next, the host control unit 201 sends to the printer control unit 101 the data to be printed, coordinate information for storing the data in the conversion area 81, and information indicating the direction in which to array the data. When operating in the page mode, images can be written freely to the conversion area 81, thus easily enabling processes such as rotating the image 90 degrees, and affording a high degree of freedom in image layout. When all print data has been written to the page range of the conversion area 81, the data is printed by a print command.

After a conversion area 81 is created for each check S and converted data for the entire image to be recorded in the check recording area 71 is written to the conversion area 81, the image is recorded on the check S while maintaining the correlation between the check recording area 71 in the recordable area 70 and the conversion area 81 in the recordable area 80.

When recording an image on the face S1 of a check S in this embodiment of the invention, a suitable conversion area 81 is first created in the recordable area 80 defined in RAM 103, print data for the image to be recorded in the check recording area 71 is written to the conversion area 81, and the image is then recorded.

Figures 8A, 8B:
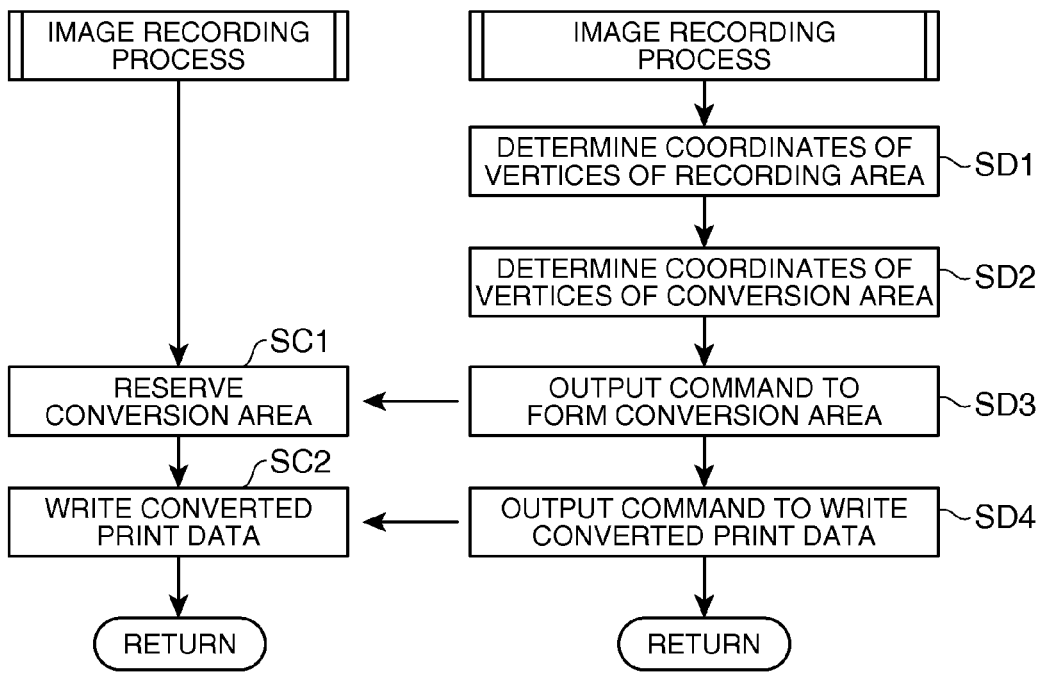
FIGS. 8A and 8B are flow charts of printer operation.

FIG. 8 is a flow chart showing the process of recording an image on the face S1 of the check S in detail, (A) indicating the operation of the printer 1, and (B) indicating the operation of the host computer 200.

As shown in FIG. 8 (B), the host control unit 201 of the host computer 200 first determines the coordinates of vertices P1, P2, P3, and P4 (see FIG. 7B), which are the four corners of the recordable area 80 to be formed in RAM 103 (step SD1).

The coordinates of these four vertices are determined as follows.

More specifically, the coordinates of vertex P1 are predefined as the specific values of the absolute origin of the recordable area 80. The length on the x-axis of the recordable area 80 is uniquely defined according to the range of second printhead 48 movement in the scanning direction, and the coordinates of vertex P2 are thus uniquely defined in conjunction with the coordinates of vertex P1.

The coordinates of vertex P3 are defined as follows.

More specifically, the length between vertex P2 and vertex P3 corresponds to the length of the check S in the conveyance direction as described above.

As a result, to define the coordinates of vertex P3, the host control unit 201 first acquires the length of the check S in the conveyance direction detected by the length detection unit 202 in step SB1 in FIG. 6.

Next, the host control unit 201 converts the length of the check S in the conveyance direction to the number of dots on the y-axis of the recordable area 80 created in RAM 103. The host control unit 201 then sets the coordinates of the point offset the converted dot count from vertex P2 in the negative direction on the y-axis as the coordinates of vertex P3.

The host control unit 201 similarly sets the coordinates of vertex P4 to the coordinates of the point off set in the negative y-axis direction from vertex P1 the same number of dots in the conveyance direction of the check S.

Note that vertices P1, P2, P3, P4 can alternatively be set by the printer control unit 101 using the length detection unit 202, for example.

Next, the conversion area formation unit 203 of the host control unit 201 determines the coordinates of the four vertices of the conversion area 81, that is, vertex T1, vertex T2, vertex T3 (first vertex), and vertex T4 (SD2).

Note that of the four corners of the conversion area 81, vertex T3 is the vertex formed at the opposite end as the end in the conveyance direction of side q2, which corresponds to the bottom edge S5 of the check S (the side guided by the guide 5d).

The conversion area formation unit 203 determines the coordinates of the four vertices T1 to T4 as follows.

More specifically, the function of the foregoing conversion area formation unit 203 can be rendered by a device driver installed on the host computer 200. To record an image on a check S, a specific application previously installed on the host computer 200 outputs information about the image to be recorded to the device driver. The image information input by the device driver includes information identifying the position of the check recording area 71 relative to the face S1 of the check S. For example, the information input to the device driver includes information denoting the distance between the sides r1, r2, r3, r4 of the check recording area 71 and the corresponding right end S6, bottom edge S5, left end S7, and top edge S4 of the check S.

Based on this information, of the four vertices, vertex U1, vertex U2, vertex U3, and vertex U4, of the check recording area 71, the conversion area formation unit 203 calculates distance d1 from vertex U3 to the bottom edge S5 of the check S (FIG. 7A), and the distance d2 (FIG. 7A) from vertex U3 to the left end S7 of the check S.

The conversion area formation unit 203 then calculates the length in the conveyance direction and the primary scanning direction from vertex U3 to the other three vertices U1, U2, U4 based on the input information.

Note that the information input to the device driver could include information denoting the distance d1 from vertex U3 to bottom edge S5 of the check S, and the distance d2 to the left end S7 of the check S, and could also include information denoting the distance in the conveyance direction and the primary scanning direction from vertex U3 to the other three vertices U1, U2, U4.

By thus determining distances d1 and d2, and the distances in the conveyance direction and the primary scanning direction from vertex U3 to vertices U1, U2, U4, the position of vertex U3 on the check S is determined by the relationship to the bottom edge S5 and left end S7 of the check S, and the positions of vertices U1, U2, U4 on the check S are determined in relationship to vertex U3.

Information related to vertices U1, U2, U3, U4 can be received by the printer 1 from the host computer 200 and acquired by the printer control unit 101. In addition, information denoting the distances between sides r1, r2, r3, r4 of the check recording area 71 and the right end S6, bottom edge S5, left end S7, and top edge S4 of the check S could be received by the printer 1 from the host computer 200, and distances d1, d2 and the positions of vertices U1, U2, U3, U4 could be determined by a calculation on the printer control unit 101 side.

Of the four vertices T1, T2, T3, T4 of the conversion area 81 to be formed in RAM 103, the conversion area formation unit 203 sets the coordinates of vertex T3 to the coordinates of the point that is separated from vertex P3 of the recordable area 80 the number of dots corresponding to the above distance d1 negatively on the x-axis, and the number of dots corresponding to the above distance d2 from vertex P3 positively on the y-axis. The conversion area formation unit 203 in this embodiment of the invention thus sets the coordinates of vertex T3 as a position relative to vertex P3 of the recordable area 80. Because the coordinates of vertex P3 of the recordable area 80 are determined using the length of the check S in the conveyance direction detected by the length detection unit 202, the conversion area formation unit 203 determines the coordinates of vertex T3 using the length of the check S in the conveyance direction detected by the length detection unit 202 referenced to a position corresponding to the bottom edge S5 of the check S (the side against the guide 5d) in RAM 103. Because the length of the check S in the conveyance direction can be detected using the BOF sensor 41 in this embodiment of the invention, the coordinates of vertex P3 can be determined according to the actual check S, and the coordinates of vertex T3 can be determined using this vertex P3.

In addition, after setting vertex T3, the conversion area formation unit 203 determines the coordinates of vertices T1, T2, T4 of the conversion area 81 so that the relationship between vertex T3 and vertices T1, T2, T4 of the conversion area 81 matches the relationship between vertex U3 and vertices U1, U2, U4 of the check recording area 71 in the check S.

The printer control unit 101 could alternatively calculate the vertices T1, T2, T3, T4 of the conversion area 81 based on information related to the vertices U1, U2, U3, U4 and d1, d2.

The coordinates of vertices T1 to T4 of conversion area 81 in this embodiment of the invention are determined by positions relative to vertex T3 referenced to the coordinates of vertex T3. This has the following advantages.

More specifically, in this embodiment as shown in FIG. 1B, recording a line of text in the check recording area 71 of the check S starts the line at side r3 at the left end S7 of the check S and proceeds towards right end S6. It is therefore desirable for the distance between the left end S7 of the check S and side r3 of the check recording area 71 to be as close as possible to the output of the above application so that the line starts as close as possible to the expected position. By setting the coordinates of vertices T1, T2, T4 referenced to the coordinates of vertex T3 (first vertex), the distance between side H3 of recordable area 80 (the side corresponding to the left end S7 of the check S) and side q3 of conversion area 81 (the side corresponding to side r3 of check recording area 71) will correspond to the value (a value related to distance d2) output by the application as the distance between the left end S7 of the check S and side r3 of check recording area 71, and this need can be appropriately met.

In addition, because magnetic ink characters S2 are recorded between the bottom edge S5 of the check S and side r2 of check recording area 71 as shown in FIG. 1B, the distance between bottom edge S5 of the check S and side r2 of the check recording area 71 is preferably a value as close as possible to the output of the application. By setting the coordinates of vertices T1, T2, T4 referenced to the coordinates of vertex T3 (first vertex), the distance between side H2 of recordable area 80 (the side corresponding to the bottom edge S5 of the check S) and side q2 of conversion area 81 (the side corresponding to side r2 of check recording area 71) will correspond to the value (a value related to distance d1) output by the application as the distance between the bottom edge S5 of the check S and side r2 of check recording area 71, and this need can be appropriately met.

Returning to FIG. 8, after the coordinates of vertices U1 to U4 of conversion area 81 are determined in step SD2, the conversion area formation unit 203 outputs a command to the printer control unit 101 of the printer 1 to create recordable area 80 in RAM 103 according to the coordinates of the above vertices P1 to P4, and create conversion area 81 according to the coordinates of the above vertices T1 to T4 (step SD4). Note that the printer control unit 101 could determine the coordinates of vertices T1 to T4 based on information related to vertices U1, U2, U3, U4 and d1, d2, and create the recordable area 80 and conversion area 81 accordingly. In this case this command is not needed.

The conversion area formation unit 203 thus has a function for determining the coordinates of the four vertices of the conversion area 81, and outputting a command to create the conversion area 81 in RAM 103 according to the coordinates of the four determined vertices.

When this command is input, the printer control unit 101 creates the recordable area 80 in RAM 103 and creates the conversion area 81 (step SC1).

The conversion area formation unit 203 of the host computer 200 and the printer control unit 101 of the printer 1 thus work together to create a conversion area 81 to which the print data recorded by the recording head (second printhead 48) to the recording surface of the slip (check S) is written in the storage space of the storage unit (RAM 103).

Next, the conversion data generating unit 204 of the host control unit 201 outputs to the printer control unit 101 of the printer 1 the data to be printed based on information input from an application (information related to the image to be recorded on the check S), and a command for converting the input data to print data for the image to be recorded in the check recording area 71 of the check S and writing the print data to conversion area 81 using a specific conversion method (step SD4).

More specifically, the conversion data generating unit 204 sends the data and command, and the printer 1 converts the received data to print data for the image to be recorded in the check recording area 71 of the check S according to a specific conversion method, and writes the resulting print data to the conversion area 81.

When this data and command are input, the printer control unit 101 converts and writes the print data for the image to be recorded in the check recording area 71 of the check S based on the content of the command in conversion area 81 (step SC2).

The conversion data generating unit 204 of the host computer 200 and the printer control unit 101 of the printer 1 thus cooperate to create and write the print data to the conversion area 81.

A specific example of the operation of step SD4 and step SC2 is described below.

FIG. 9A, FIG. 9B, FIG. 9C are referred to below to describe the operation of step SD4 and step SC2.

FIG. 9A shows an example of the final image recorded on the check S. The operation of step SD4 and step SC2 is described below using an example in which a string of four characters ABCD is printed on one line and another string of four characters 1234 is printed on the next line as shown in FIG. 9A.

In this case in step SD4, the conversion data generating unit 204 outputs to the printer control unit 101 based on input from the application data representing the content as shown in FIG. 9B (content indicating recording the string of four characters ABCD starting with the letter A, starting a new line, and recording the string of four characters 1234 starting with the number 1) and a command for converting this data to print data according to a specific method described below and writing the print data to conversion area 81. Note that a new line is determined by detecting a code (CR, LF) indicating a new line.

The printer control unit 101 to which this data and command are input converts the input data to print data written to conversion area 81 as described below.

More specifically, as shown in FIG. 9C, the printer control unit 101 converts the input data and commands to print data by starting from the origin at vertex T3 of conversion area 81 and writing (converting) the converted print data from vertex T3 to vertex T2 (the direction in line with the conveyance direction). More specifically, following the input data and commands, the printer control unit 101 determines the string 1234 to be recorded on the bottom line of the plural text strings, and writes bitmap data for the image of the first character (1) in this string rotated 90 degrees counterclockwise to the position at vertex T3 (FIG. 9C (C-1)). The printer control unit 101 then writes bitmap data for the next character (2) to the position adjacent in the conveyance direction to the bitmap data for the character (1). The printer control unit 101 thus sequentially converts and writes bitmap data for the characters contained in the string 1234 in a specific conversion direction (the direction corresponding to the conveyance direction) (FIG. 9C (C-2)).

The printer control unit 101 then finds the text string ABCD to be recorded on the line above the string 1234, and converts this string ABCD to the line above the string 1234 in the same conversion direction (FIG. 9C (C-3)).

Converting the print data from vertex T3 of the conversion area 81 as described above has the following advantages.

As noted above, all checks S are not the same size, and the width of the check S is not constant. Referring to FIG. 7A, the position of top edge S4 in the recordable area 70 is therefore not constant. However, because the check S is conveyed with the bottom edge S5 following the guide 5d in this embodiment, the position of the bottom edge S5 of the recordable area 70 always overlaps side h2 of the recordable area and is constant. Therefore, by writing the converted print data from the origin at vertex T3, plural lines of text will be sequentially converted to an image of that text from the bottom edge S5 side to the top edge S4 side of the conversion area 81, and the text string images can be efficiently recorded in the check recording area 71.

As described above, this embodiment of the invention assumes that a line of text will be recorded in the check recording area 71 of the check S with each line starting at side r3 corresponding to the left end S7 of the check S and proceeding toward the right end S6 side. As a result, by converting the print data starting from the origin at vertex T3, images related to each character in the string will be sequentially converted and written from the left end S7 side to the right end S6 side of the conversion area 81, and images of the text strings can be recorded efficiently to the check recording area 71 regardless of the length of the check S in the conveyance direction. In addition, text strings can be recorded in the same direction as the line of magnetic ink characters S2 while automatically changing the line.

The conversion adjustment unit 110 of the printer control unit 101 runs the following process to write print data to the conversion area 81.

Figure 10A:
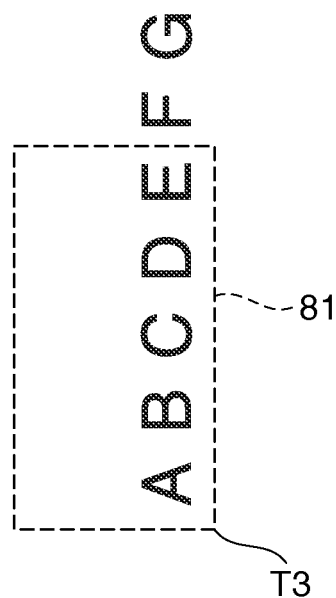
FIG. 10A and FIG. 10B describe the operation of the conversion adjustment unit.
Figure 10B:
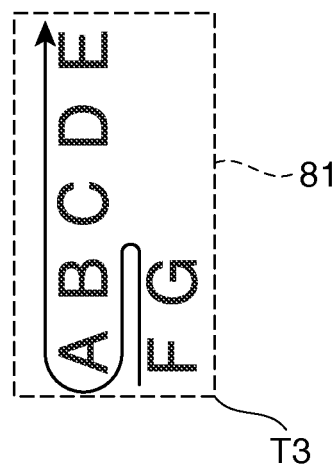

FIG. 10A and FIG. 10B describe the operation of the conversion adjustment unit 110, and schematically show the conversion area 81 and text strings to be written to the conversion area 81.

As shown in FIG. 10, the length of the text string to be converted without inserting a new line may be greater than the length of the conversion area 81 in the direction corresponding to the conveyance direction.

For each string to be written to the conversion area 81, the conversion adjustment unit 110 compares the length of the conversion area 81 in the direction corresponding to the conveyance direction with the length of the print data related to the string, and if the length of the print data related to the string is greater, inserts a new line at an appropriate position in the string before converting the string to print data so that the print data for the string all fits in the conversion area 81 as shown in FIG. 10B. As shown in FIG. 10B, the direction in which the conversion adjustment unit 110 changes the line is the direction in which the second carriage 58 moves, and is the direction corresponding to the direction perpendicular to the conveyance direction. By writing the string in this direction to the conversion area 81, print data for the string can be appropriately written in the conversion area 81.

Referring again to FIG. 8 (A), after the print data is written to the conversion area 81 in step SC2, the printer control unit 101 controls the slip feed motor 38 and conveys the check S while controlling the second printhead 48 to record an image on the check S based on the print data written to the conversion area 81.

The printer control unit 101 and host control unit 201 thus work together to record an image on the face S1 of the check S.

Returning to FIG. 6, after recording an image to the face S1 of the check S in step SA14, the printer control unit 101 drives the slip feed motor 38 and discharges the check S from the media exit 4 using the second paper feed rollers 37 (step SA15).

The check S has reached a position protruding from the media exit 4 at this time, but the trailing end of the check S is inside the media exit 4 and the presence of a check S is detected by the EJD sensor 49. The printer control unit 101 waits until the operator removes the check S (step SA16), and when the check S is removed and change in the output of the EJD sensor 49 is detected (step SA17 returns Yes), drives the roller opening motor 39 and stopper drive unit 44a and resumes the standby mode (step SA18). When a check S is inserted, this operation thus reads the magnetic ink characters S2 and prints on the face S1 of the check S.

As described above, the printer system 300 according to this embodiment of the invention has a conveyance unit (printer control unit 101) that conveys a check S with the bottom edge S5 (one side) of the check S following a guide 5d that extends in the conveyance direction; a length detection unit 202 that detects the length of the check S in the conveyance direction; and a conversion area formation unit 203 that creates a conversion area 81, which is an area where converted print data for the entire image to be recorded in a rectangular area formed on the recording surface of the check S is written, in RAM 103 used as a storage area. The conversion area formation unit 203 determines the coordinates of the vertices of the conversion area 81 in RAM 103 referenced to a position corresponding to the bottom edge S5 (one side) of the check S in RAM 103 by using the length of the check S in the conveyance direction detected by the length detection unit 202.

Because the check S is conveyed with the bottom edge S5 (one side) of the check S against a guide 5d extending in the conveyance direction, the range of the conversion area 81 in RAM 103 can be appropriately defined to reflect the actual length of the check S in the conveyance direction, and the conversion area 81 can be created to reflect the fact that all checks S are not the same size.

In this embodiment of the invention magnetic ink characters S2 are recorded on the check S, a MICR head 42 (reading unit) reads the line of magnetic ink characters S2 on the check S conveyed in the conveyance direction, and a BOF sensor 41 (media detection sensor) that is disposed upstream in the conveyance direction from the MICR head 42 at a position K1 that the trailing end (left end S7) of the check S passes before the check S is conveyed to the completion of reading the magnetic ink characters S2 by the MICR head 42 detects if a check S is present at the position K1. A length detection unit 202 detects the length of the check S in the conveyance direction based on the distance the check S is conveyed by the conveyance unit (printer control unit 101) and BOF sensor 41 output.

As a result, the length detection unit 202 can detect the length of the check S in the conveyance direction while the check S is conveyed to read the magnetic ink characters S2, conveying the check S specifically to detect the length of the check S is unnecessary, and process efficiency is improved.

This embodiment also has a conversion data generating unit 204 that writes converted print data to a conversion area 81 referenced to vertex T3, which of the four vertices of the conversion area 81 is the vertex on the side corresponding to the bottom edge S5 (one side) of the check S at the opposite end as the end in the conveyance direction.

As a result, the print data is written to the conversion area 81 from the side corresponding to the bottom edge S5 of the check S (the side that follows the guide 5d when the check S is conveyed), and the print data can be efficiently written to the conversion area 81 to reflect that the width of all checks S is not the same.

The conversion data generating unit 204 in this embodiment writes the print data to conversion area 81 starting from the origin at vertex T3 and proceeding in a write direction that is the same as the conveyance direction.

As a result, print data can be written to the conversion area efficiently while reflecting that the length of all checks S in the conveyance direction is not the same.

The printer system 300 according to this embodiment of the invention also has a conversion adjustment unit 110 that, when writing the print data for one line of text in the write direction of the conversion area 81 and the line will not fit in the conversion area 81, inserts a new line code so that the entire line will fit in the conversion area 81.

Text strings are thus converted character by character in the conversion area 81, and failure to record a portion of the characters contained in the string on the check S can be prevented.

The foregoing embodiment is one example of an embodiment of the invention, and can be varied in many ways without departing from the scope of the invention.

For example, the length detection unit 202, conversion area formation unit 203, and conversion data generating unit 204 are part of the host control unit 201 of the host computer 200 in the embodiment described above. However, a configuration in which these functions are rendered by the printer control unit 101 of the printer 1 is also conceivable, enabling the printer 1 alone to perform the operation of the invention described above. More specifically, the printer 1 in this case is a device that can connect to the host computer 200 as a control device, and includes a second printhead 48 that records on checks S and other slips; a guide 5d that extends in the conveyance direction; a conveyance unit that conveys checks S with one side of the check S slip following the guide 5d; a length detection unit (a unit with the same function as the length detection unit 202 above) that detects the length of the check S in the conveyance direction; RAM 103; and a conversion area formation unit (a unit with the same function as the conversion area formation unit 203 above) that creates a conversion area in RAM 103.

The printer 1 could also store font data corresponding to font codes in flash ROM 105, read the font data from flash ROM 105 when font codes are received from the host computer 200, and write print data to the conversion area 81 in the order the font codes were received. When the printer 1 receives image data from the host computer 200, the image data can be written as the print data directly to conversion area 81 in the order received. The print data can also be data in a form that can be used to directly drive the thermal head 16.

The foregoing embodiment describes the invention using an example in which the second printhead 48 records an image on the face S1 of the check S, but the invention can also be used when recording an image on the back S3 of the check S using the first printhead 46. More specifically, the invention can be broadly adapted to devices having a function that forms a conversion area 81 in a storage area and records images based on print data written to the conversion area 81.

The invention having been thus described, it will be apparent to one skilled in the art based on such disclosure that the invention may be varied in many ways. Any such variation is intended to be within the spirit and scope of the invention to the extent such variation falls within the scope of the following claims.

What is claimed is:

1. A printer configured to couple to a control device, the printer comprising:
    a conveyance path, a first side of which is configured to guide a slip on a guided side and a second side of which is open;
    a conveyor configured to convey the slip through the conveyance path in a conveyance direction, wherein when the slip is being conveyed through the conveyance path, the slip has a leading ledge in the conveyance direction, a trailing edge behind the leading edge in the conveyance direction, a guided edge along the first side, and an unguided edge opposite the first side;
    a recording head movable along a scanning path intersecting the conveyance path, the scanning path having a maximum scan length, the recording head being configured to move along the scanning path to record on the slip;
    a guide configured to extend in the conveyance direction and to be arranged on the first side of the conveyance path;
    a length detector disposed in the conveyance path and configured to detect the length of the slip in the conveyance direction;
    an interface configured to receive a code including a font code from the control device, and parameters defining a recording area on the slip;
    a print memory configured to store font data corresponding to the font code;
    a print memory configured to store a recordable area memory space rectangular in shape and having a first dimension corresponding to a direction perpendicular to the conveyance path and whose span is defined by the maximum scan length of the scanning path, wherein a height side of the recordable area memory space along the first dimension corresponds to the trailing edge of the slip, said recordable area memory space including a conversion area that defines a memory space corresponding to the recording area on the slip; and
    a controller configured to assign a length to the second dimension of the recordable area memory space based on the detected length of the slip in the conveyance direction, wherein a base side of the recordable area memory space along the second dimension corresponds to the guided edge of the slip, the controller being further configured to assign dimensions to the conversion area corresponding to the dimensions of the recording area on the slip and to assign the conversion area a position within the recordable area memory space corresponding to a relative position of the recording area on the slip when a first origin vertex defined by an intersection of the height side and base side of the recordable area memory space is reference to a second origin vertex defined by an intersection of the trailing edge and guided edge of the slip;
    wherein:
    the controller reads the font data from the font memory based on the font code, writes the font data into the conversion area starting from a starting position at a corner of the conversion area closest to the first origin vertex of the recordable area memory space, writes the font data in line units along the base side in the order in which the font code is received, wherein when a current line unit is ended, the entire contents of the conversion area are shifted along the height side away from the base side and a new line is defined underneath the shifted contents and starting at the starting position; and
    after writing to the conversion area ends, the controller controls the recording head to record the font data in the conversion area onto the recording area on the slip in scanning paths such that the lines as a block are justified relative to the first side of the conveyance path.

2. The printer described in claim 1, wherein:
the length detector includes a media detection sensor that detects if the slip is present; and
the length detector detects the length of the slip in the conveyance direction based on the distance the slip is conveyed by the conveyor and an output from the media detection sensor.

3. The printer described in claim 1, wherein:
when writing the font data for one line into a current line unit of the conversion area, if part of the font data for the one line will not fit in the current line unit, the controller inserts a line change to end the current line unit and create a new line unit underneath the shift contents of the conversion area, and then continues writing the font data for the one line into the new line unit of conversion area.

4. The printer described in claim 3, wherein:
the recording head is mounted and moved on a carriage; and
the direction the controller shifts its contents is in a direction corresponding to the direction of carriage movement away from the first side of the conveyance path and toward the second side of the conveyance path.

5. The printer described in claim 3, wherein:
the controller writes the font data to the conversion area in a direction enabling reading the text in a direction toward the second side of the conveyance path.

6. A printer configured to couple to a control device, the printer comprising:
a conveyance path, a first side of which is configured to guide a slip on a guided side and a second side of which is open;
a conveyor configured to convey the slip through the conveyance path in a conveyance direction, wherein when the slip is being conveyed through the conveyance path, the slip has a leading edge in the conveyance direction, a trailing edge behind the leading edge in the conveyance direction, a guided edge along the first side, and an unguided edge opposite the first side;
a recording head movable along a scanning path intersecting the conveyance path, the scanning path having a maximum scan length, the recording head being configured to move along the scanning path to record on the slip;
a guide configured to extend in the conveyance direction and to be arranged on the first Bide of the conveyance path;
a recordable area memory space rectangular in shape and having a first dimension corresponding to a direction perpendicular to the conveyance direction and a second dimension corresponding to the conveyance direction, the recordable area memory space having a height side along the first dimension, the height side having a span defined by the maximum scan length of the scanning path and corresponding to the trailing edge of the slip, the recordable area memory space having a base side along the second dimension, the base side having a span defined by the length of the slip in the conveyance direction and corresponding to the guided edge of the slip; and
a controller configured to control:
(i) font code received from the control device for converting font data, define a conversion area within the recordable area memory space into which the converted font data is to be written, the conversion area being defined to have dimensions matching a recording area on the slip and to have a relative position within the recordable area memory space corresponding to a relative position of the recording area on the slip as determined by matching a first vertex defined by the intersection of the height side and base side of the recordable area memory space to a second vertex defined by the intersection of the trailing edge and guided edge of the slip;
(ii) the recording head to record the font data in the conversion area to the recording area on the slip along the guided side of the slip in the conveyance direction with reference to a position on the guided side of the slip and on an upstream side of the recording area in the conveyance direction such that lines are recorded in a direction from the second side of the conveyance path toward the first side of the conveyance path and such that the lines as a block are justified relative to the second side of the conveyance path, and
(iii) writing the converted font data into the conversion area in line units in the conveyance direction in the order in which the font code is received from a starting position closest to the first vertex, inserting a new line command into the conversion area as needed so each line fits within the recording area in the conveyance direction, wherein the recording head records the font data from the conversion area onto the recording area on the slip in paths scanning from the first side of the conveyance path to the second side of the conveyance path.

7. The printer described in claim 6, wherein:
when recording the font data in the conveyance direction of the slip and the line changes, the controller controls the recording head to change the line in a direction away from the first side of the conveyance path and toward the second side of the conveyance path.

8. The printer described in claim 6, wherein:
when recording the font data in the conveyance direction of the slip, the controller controls the recording head to record in a direction that enables reading the text away from the first side of the conveyance path and toward the second side of the conveyance path.

9. A method of controlling a printer configured to couple to a control device, comprising steps of:
conveying a slip through a conveyance path that has a guide on one side and is open on the other side, the guide extending in the conveyance direction and arranged to guide a guided side of the slip as it is conveyed through the conveyance path, wherein when the slip is being conveyed through the conveyance path, the slip has a leading edge in the conveyance direction, a trailing edge behind the leading edge in the conveyance direction, a trailing edge behind the leading edge in the conveyance direction, a guided edge along the one side;
providing a recording head movable along a scanning path intersecting the conveyance path, the scanning path having a maximum scan length, the recording head being configured to move along the scanning path to record on the slip;
detecting the length of the slip in the conveyance direction as the slip is conveyed through the conveyance path;
receiving a code from the control device including a font code and parameters defining a recording area on the slip;
acquiring, based on the font code, font data from a memory that stores the font data corresponding to the font code;
defining a recordable area memory space rectangular in shape and having a first dimension corresponding to a direction perpendicular to the conveyance path and a second dimension parallel to the conveyance path, wherein the recordable area memory space has a height side along the first dimension whose span is defined by the maximum scan length of the scanning path and the corresponds to the trailing edge of the slip, the recordable area memory space has a base side along the second dimension whose span is defined by the detected length of the slip in the conveyance direction and that corresponds to the guided edge of the slip;

defining a conversion area within the recordable area memory space, the dimensions of the conversion area being made to correspond to the dimensions of the recording area on the slip and the conversion area being give a relative position with the recordable area memory space corresponding to a relative position of the recording area on the slip as determined by referencing a first origin vertex defined by an intersection of the height side and base side of the recordable area memory space to a second origin vertex defined by an intersection of the trailing edge and guided edge of the slip writing the font data into the conversion area along the second dimension starting from a starting position at a corner of the conversion area closest to the first origin vertex of the recordable area memory space, wherein the font data is written in line units in the order in which the font code is received wherein when a current line unit is ended, the entire contents of the conversion area are shifted along the height side away from the base side and a new line is defined underneath the shifted contents and starting at the starting position; and after writing to the conversion area ends, recording the font data from the conversion are onto the recording area on the slip in scanning paths along the conveyance direction such that the lines as a block are justified relative to the guided side of the slip.

10. The method of controlling a printer described in claim 9, wherein:

when recording the font data in the conveyance direction of the slip, recording proceeds in a direction enabling reading the text in a direction toward the open side of the conveyance path.

11. The printer described in claim 1, wherein:

when the interface receives a code indicating a new line, the controller changes the line in a direction away from the first side of the conveyance path and toward the second side of the conveyance path.

12. The printer described in claim 1, wherein:

when one line unit in the conversion area is full with font data, the controller changes the line in a direction away from the first side of the conveyance path and toward the second side of the conveyance path.

13. The printer described in claim 6, wherein:

when a code indicating a new line is received, the controller changes the line in the conversion area to correspond to a direction away from the first side of the conveyance path and toward the second side of the conveyance path.

14. The printer described in claim 6, wherein:

when one line unit in the conversion area is full with font data, the controller changes the line in the conversion area to correspond to a direction away from the first side of the conveyance path and toward the second side of the conveyance path.

15. The method of controlling a printer described in claim 9, wherein:

when a code indicating a new line is received, the method further comprises changing the line in the conversion area to correspond to a direction away from the guide side of the conveyance path and toward the open side of the conveyance path.

16. The method of controlling a printer described in claim 9, wherein:

when one line in the conversion area is full with font data, the method further comprises changing the line in the conversion area to correspond to a direction away from the guide side of the conveyance path and toward the open side of the conveyance path.

* * * * *